US008457655B2

(12) United States Patent
Zhang et al.

(10) Patent No.: US 8,457,655 B2
(45) Date of Patent: Jun. 4, 2013

(54) HYBRID TIME OF ARRIVAL BASED POSITIONING SYSTEM

(75) Inventors: Xiaoxin Zhang, Sunnyvale, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/236,232

(22) Filed: Sep. 19, 2011

(65) Prior Publication Data

US 2013/0072219 A1   Mar. 21, 2013

(51) Int. Cl.
*H04W 24/00* (2009.01)

(52) U.S. Cl.
USPC .............. 455/456.1; 455/422.1; 455/427; 455/440; 370/328; 370/338

(58) Field of Classification Search
USPC ............ 455/456.1–457, 422.1, 427, 440; 370/328–338
See application file for complete search history.

(56) References Cited

U.S. PATENT DOCUMENTS

| | | | |
|---|---|---|---|
| 6,034,635 A | 3/2000 | Gilhousen | |
| 6,166,685 A | 12/2000 | Soliman | |
| 6,420,999 B1 | 7/2002 | Vayanos | |
| 6,618,005 B2 | 9/2003 | Hannah et al. | |
| 6,744,398 B1 | 6/2004 | Pyner et al. | |
| 7,289,813 B2 | 10/2007 | Karaoguz | |
| 2001/0053699 A1* | 12/2001 | McCrady et al. | 455/513 |
| 2002/0155845 A1 | 10/2002 | Martorana | |
| 2002/0196184 A1 | 12/2002 | Johnson et al. | |
| 2003/0134647 A1 | 7/2003 | Santhoff et al. | |
| 2004/0008138 A1 | 1/2004 | Hockley, Jr. et al. | |
| 2004/0147269 A1 | 7/2004 | Kim | |
| 2004/0258012 A1 | 12/2004 | Ishii | |
| 2004/0264407 A1 | 12/2004 | Tang et al. | |
| 2005/0135257 A1 | 6/2005 | Stephens et al. | |
| 2007/0121560 A1 | 5/2007 | Edge | |

(Continued)

FOREIGN PATENT DOCUMENTS

| | | |
|---|---|---|
| WO | 2012170046 | 12/2012 |
| WO | 2012170062 | 12/2012 |

(Continued)

OTHER PUBLICATIONS

International Search Report and Written Opinion—PCT/US2011/054977—ISA/EPO—Jan. 31, 2012, 7 pages.

(Continued)

*Primary Examiner* — Chuong A Ngo
(74) *Attorney, Agent, or Firm* — DeLizio Gilliam, PLLC

(57) ABSTRACT

A hybrid TOA positioning system can be implemented to improve location estimation of a wireless network device. An initial location of the wireless network device can be calculated based on locations of a plurality of reference network devices. A first intermediate location of the wireless network device and an intermediate distance calibration constant can be determined based, at least in part, on the initial location of the wireless network device and distance between the wireless network device and each of the reference network devices. A second intermediate location of the wireless network device and a target distance calibration constant can be calculated based on the locations of the reference network devices, the first intermediate location, and/or the intermediate distance calibration constant. The location of the wireless network device can be iteratively estimated based, at least in part, on the second intermediate location and the target distance calibration constant.

25 Claims, 7 Drawing Sheets

U.S. PATENT DOCUMENTS

| | | | |
|---|---|---|---|
| 2007/0296633 | A1 | 12/2007 | Yanagihara |
| 2008/0103696 | A1 | 5/2008 | Cheok et al. |
| 2008/0125161 | A1* | 5/2008 | Ergen et al. .................. 455/524 |
| 2008/0130604 | A1 | 6/2008 | Boyd |
| 2008/0188236 | A1 | 8/2008 | Alles et al. |
| 2008/0248741 | A1 | 10/2008 | Alizadeh-Shabdiz |
| 2008/0287139 | A1 | 11/2008 | Carlson et al. |
| 2009/0280825 | A1 | 11/2009 | Malik et al. |
| 2010/0135178 | A1 | 6/2010 | Aggarwal et al. |
| 2010/0150117 | A1 | 6/2010 | Aweya et al. |
| 2011/0059752 | A1 | 3/2011 | Garin et al. |
| 2011/0117925 | A1 | 5/2011 | Sampath et al. |
| 2011/0136506 | A1 | 6/2011 | Stewart |
| 2011/0188389 | A1 | 8/2011 | Hedley et al. |
| 2011/0244881 | A1* | 10/2011 | Bando et al. ................ 455/456.1 |
| 2012/0087272 | A1 | 4/2012 | Lemkin et al. |
| 2013/0005347 | A1 | 1/2013 | Curticapean |
| 2013/0072217 | A1 | 3/2013 | Zhang et al. |
| 2013/0072218 | A1 | 3/2013 | Zhang et al. |
| 2013/0072220 | A1 | 3/2013 | Zhang et al. |

FOREIGN PATENT DOCUMENTS

| | | |
|---|---|---|
| WO | 2013043664 | 3/2013 |
| WO | 2013043675 A1 | 3/2013 |
| WO | 2013043681 | 3/2013 |
| WO | 2013043685 | 3/2013 |

OTHER PUBLICATIONS

U.S. Appl. No. 13/155,037, Curticapean; Florean.
U.S. Appl. No. 13/158,029, Hirsch; Olaf J.
U.S. Appl. No. 13/170,353, Curticapean; Florean.
U.S. Appl. No. 13/236,172, Zhang; Xiaoxin et al.
U.S. Appl. No. 13/236,208, Zhang; Xiaoxin et al.
U.S. Appl. No. 13/236,259, Zhang; Xiaoxin et al.
U.S. Appl. No. 13/278,642, Zhang; Xiaoxin et al.
U.S. Appl. No. 13/315,174, Zhang; Xiaoxin et al.
International Search Report and Written Opinion—PCT/US2011/043781—ISA/EPO—Nov. 17, 2011, 7 pages.
International Search Report and Written Opinion—PCT/US2011/046074—ISA/EPO—Dec. 16, 2011, 10 pages.
U.S. Appl. No. 13/236,172 Office Action, Jan. 3, 2013, 25 pages.
U.S. Appl. No. 13/236,172 Office Action, Jun. 7, 2012, 25 pages.
U.S. Appl. No. 13/158,029 Office Action, Oct. 3, 2012, 18 pages.
U.S. Appl. No. 13/236,208 Office Action, Nov. 7, 2012, 14 pages.
Foy, W.H., "Position-Location Solutions by Taylor-Series Estimation", IEEE Transactions on Aerospace and Electronic Systems, IEEE Service Center, Piscataway, N.J., U.S., vol. AES-10, No. 2,1 Mar. 1976 (Mar. 1, 1976), pp. 187-194, XP011166129, ISSN: 0018-9251.
Kleine-Ostmann, T., et al., "A data fusion architecture for enhanced position estimation in wireless networks", IEEE Communications Letters, IEEE Service Center, Piscataway, N.J., U.S., vol. 5, No. 8, Aug. 1, 2001 (Aug. 1, 2001), pp. 343-345, XP011423565, ISSN: 1089-7798, DOI: 10.1109/4234.940986 Sections II and III.
Li, H., et al., "Combination of Taylor and Chan method in mobile positioning", Cybernetic Intelligent Systems (CIS), 2011 IEEE 10TH International Conference on, IEEE, Sep. 1 2011 (Sep. 1, 2011), pp. 104-110, XP932136955, DOI: 10.11091 CIS.2011.6169143 ISBN: 978-1-4673-0687-4 Abstract Sections I-III.
Shen, G., et al., "Performance comparison of TOA and TDOA based location estimation algorithms in LOS environment", (WPNC '08) 5TH, IEEE, Mar. 27, 2008 (Mar. 27, 2008), pp. 71-78, XP031247832, ISBN: 978-1-4244-1798-8 Section II (TOA Based Location Estimation Algorithms}: "C. Taylor Series Method".
PCT Application No. PCT/US12/56017 International Search Report, Jan. 3, 2013, 14 pages.
PCT Application No. PCT/US12/56053 International Search Report, Jan. 3, 2013, 13 pages.
PCT Application No. PCT/US2012/056036 International Search Report, Jan. 3, 2013, 13 pages.
"PCT Application No. PCT/US2012/068543 International Search Report", Feb. 15, 2013, 15 pages.
"PCT/US20121056046 International Search Report", Jan. 3, 2013, 13 pages.
Gholami, Mohammad R. et al., "Positioning algorithms for cooperative networks in the presence of an unknown turn-around time", 2011 IEEE 12th Workshop on Signal Processing Advancesin Wireless Communications (SPAWC 2011) IEEE Piscataway,NJ, USA, IEEE, Piscataway, NJ, USA, XP032035718, 001: 10.11 09/SPAWC.2011. 5990386; ISBN: 978-1-4244-9333-3 Jun. 26, 2011, 166-170.
Yu, K et al., "TOA-based distributed localisation with unknown internal delays and clock frequency offsets in wireless sensor networks", IET Signal Processing vol. 3, No. 2 XP006032603, ISSN: 1751-9683, 001: 10.1049IET-SPR:20080029 Mar. 2, 2009, 106-118.
PCT Application No. PCT/US2012/061081 International Search Report, Mar. 27, 2013, 11 pages.
"U.S. Appl. No. 13/155,037 Office Action", Apr. 3, 2013, 20 pages.

\* cited by examiner

HYBRID TIME OF ARRIVAL BASED POSITIONING SYSTEM

BACKGROUND

Embodiments of the inventive subject matter generally relate to the field of wireless communication and, more particularly, to a hybrid time of arrival (TOA) based positioning system.

A wireless communication device can use various position estimation techniques to determine an unknown location of the wireless communication device based on communicating with a plurality of reference wireless communication devices with known locations. For example, the wireless communication device can employ round trip time (RTT) based positioning techniques by determining the travel time of radio signals from the wireless communication device to the reference wireless communication devices. The wireless communication device can determine the distance to the reference wireless communication devices based on the determined travel time of the radio signals and can use time of arrival (TOA) positioning techniques to determine the unknown location.

SUMMARY

Various embodiments of a hybrid time of arrival (TOA) positioning mechanism are disclosed. In one embodiment, a wireless network device of a communication network determines a round trip transit time between the wireless network device and each of a plurality of reference wireless network devices of the communication network. For each of the plurality of reference wireless network devices, a distance between the wireless network device and the reference wireless network device is determined based, at least in part, on the round trip transit time between the wireless network device and the reference wireless network device. An initial location of the wireless network device is calculated based, at least in part, on a location of each of the plurality of reference wireless network devices. A first intermediate location of the wireless network device and an intermediate distance calibration constant are determined based, at least in part, on the initial location of the wireless network device and the distance between the wireless network device and each of the plurality of reference wireless network devices. A second intermediate location of the wireless network device is calculated based on at least one of the location of each of the plurality of reference wireless network devices and the first intermediate location of the wireless network device. A target distance calibration constant associated with the plurality of reference wireless network devices is calculated based on at least one of the first intermediate location of the wireless network device, the intermediate distance calibration constant, and the distance between the wireless network device and the plurality of reference wireless network devices. A location of the wireless network device is iteratively estimated based, at least in part, on the second intermediate location of the wireless network device and the target distance calibration constant.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
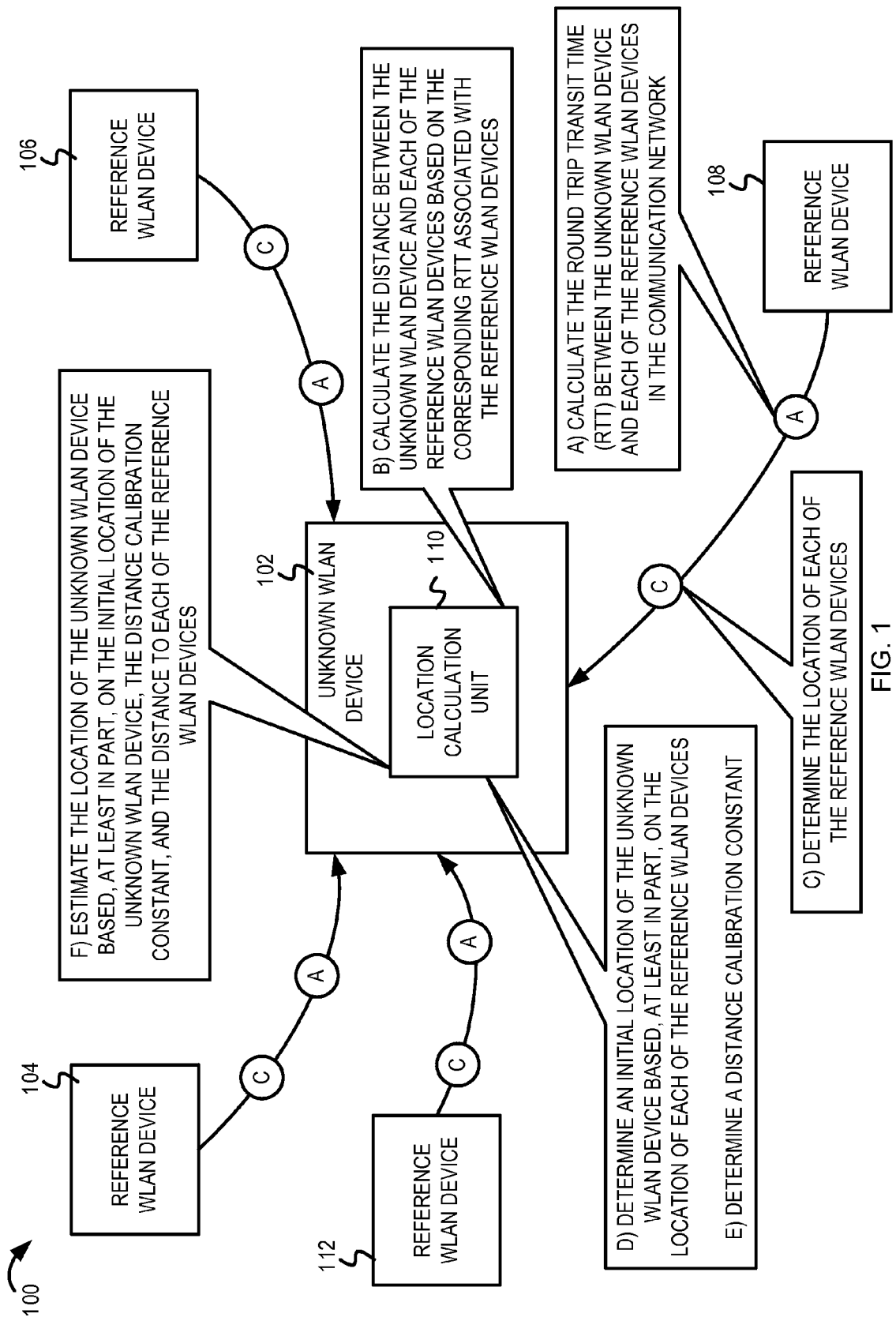
FIG. 1 is an example block diagram illustrating a mechanism for estimating the unknown location of a network device in a wireless communication network.

The description that follows includes exemplary systems, methods, techniques, instruction sequences, and computer program products that embody techniques of the present inventive subject matter. However, it is understood that the described embodiments may be practiced without these specific details. For instance, although examples refer to wireless local area network (WLAN) devices (e.g., 802.11n compatible devices) executing the location estimation techniques described herein, embodiments are not so limited. In other embodiments, various other devices and standards (e.g., WiMAX) can execute the location estimation techniques. In other instances, well-known instruction instances, protocols, structures, and techniques have not been shown in detail in order not to obfuscate the description.

A network device associated with an unknown location ("unknown network device") can use a TOA based positioning algorithm to determine its location based on a plurality of reference network devices. Depending on the implementation, the TOA positioning algorithm may or may not require an accurately known distance calibration constant to estimate the location of the unknown network device. Conventional TOA positioning algorithms typically use, as inputs, an arbitrarily selected initial location of the unknown network device, an arbitrarily selected distance calibration constant, and the distance to and locations of each reference network device to iteratively calculate the location of the unknown network device. Typically, the initial location of the unknown network device is zero (e.g., where the X, Y, and Z coordinates are zero) or a randomly selected value. Likewise, the initial distance calibration constant is also typically zero or a randomly selected value. However, the conventional TOA positioning algorithms can be very sensitive to the initial location of the unknown network device. Furthermore, some conventional TOA positioning algorithms may be sensitive to the distance calibration constant. Employing a randomly selected value or a zero value of the initial location can render the conventional TOA positioning algorithms unsolvable (e.g., by making the value of one or more determinants approach zero or infinity) and can result in the conventional TOA positioning algorithms not converging to an appropriate solution (i.e., the location of the unknown network device). Also, not knowing or randomly selecting the distance calibration constant can result in poor performance of the conventional TOA positioning algorithms, can result in the conventional TOA positioning algorithms not converging to the appropriate location of the unknown network device, and/or can result in the conventional TOA positioning algorithms converging to the wrong solution.

In some implementations, a first TOA positioning system that employs a calculated (rather than an arbitrarily selected) initial location of the unknown network device can be implemented to minimize the sensitivity of some of the conventional TOA positioning algorithms to the initial location of the unknown network device. The first TOA positioning system is typically not sensitive to the distance calibration constant and may utilize an arbitrarily selected distance calibration constant for positioning calculations. The first TOA positioning system that can utilize the arbitrarily selected distance calibration constant is referred to herein as "TOA1 positioning system." The initial location of the unknown network device can be calculated based, at least in part, on known locations of the reference network devices. The TOA1 positioning system can execute a single iteration (rather than multiple iterations) to calculate the location of the unknown network device and the distance calibration constant based, at least in part, on the calculated initial location of the unknown network device and the distance to each of the reference network devices. Calculating (rather than arbitrarily guessing) the initial location of the unknown network device can mitigate location sensitivity issues, ensure convergence of the TOA1 positioning system in determining the location of the unknown network device, and improve the performance and the positioning accuracy of the TOA1 positioning system. Moreover, by executing only a single iteration to estimate the location of the unknown network device, the TOA1 positioning system can minimize the resources and the time consumed to calculate the location of the unknown network device.

In some implementations, a hybrid TOA positioning system can improve the performance of estimating the location of the unknown network device. As part of the hybrid TOA positioning system, the TOA1 positioning system described above can execute a single iteration to estimate the location of the unknown network device (referred to herein as "intermediate location of the unknown network device") and a distance calibration constant (referred to herein as "intermediate distance calibration constant"). The intermediate location of the unknown network device and the intermediate distance calibration constant (along with the location of the reference network devices and the distance to each of the reference network devices) can then be used to calculate a target (or estimated) distance calibration constant and a second intermediate location of the unknown network device. In addition, the hybrid TOA positioning system can also comprise a second TOA positioning system referred to herein as "TOA2 positioning system." The second TOA positioning system is typically sensitive to the distance calibration constant and may not utilize an arbitrarily selected distance calibration constant for positioning calculations. Instead, the TOA2 positioning system can utilize the intermediate distance calibration constant calculated by the TOA1 positioning system for positioning calculations, as will be described below. The hybrid TOA positioning system can iteratively execute the TOA2 positioning system based, at least in part, on the target distance calibration constant and the second intermediate location to estimate the location ("estimated location") of the unknown network device. Calculating (rather than guessing) the target distance calibration constant can minimize sensitivity to the distance calibration constant, minimize positioning error associated with determining the location of the unknown network device, increase positioning accuracy and improve performance gain, consequently improving the overall performance of the unknown network device.

FIG. 1 is an example block diagram illustrating a mechanism for estimating the unknown location of a network device in a wireless communication network 100. In one example, the wireless communication network 100 comprises a WLAN device 102 with an unknown location ("unknown WLAN device") and four reference WLAN devices 104, 106, 108, and 112. The unknown WLAN device 102 comprises a location calculation unit 110. In some implementations, the location calculation unit 110 may be implemented in a communication unit of the unknown WLAN device 102 that implements protocols and functionality to enable WLAN communication in the wireless communication network 100. It is noted that although not depicted in FIG. 1, in some embodiments one or more of the reference WLAN devices 104, 106, 108, and 112 can also comprise a location calculation unit and corresponding functionality for determining their respective location. In some implementations, the unknown WLAN device 102 and the reference WLAN devices 104, 106, 108, and 112 can each be electronic devices with WLAN communication capabilities, such as a laptop computer, a tablet computer, a mobile phone, a smart appliance, a gaming console, an access point, or other suitable electronic devices. The unknown WLAN device 102 can execute operations to determine its location, as will be described below in stages A-F.

At stage A, the location calculation unit 110 determines the round trip transit time (RTT) between the unknown WLAN device 102 and each of the reference WLAN devices 104, 106, 108, and 112 in the wireless communication network 100. In one implementation, the location calculation unit 110 can transmit one or more control messages to the reference WLAN device 104 and can receive corresponding one or more response control messages (e.g., acknowledgement (ACK) messages) from the reference WLAN device 104. The location calculation unit 110 can also record the time instants at which the control messages were transmitted to and the corresponding response control messages were received from the reference WLAN device 104. The location calculation unit 110 can then calculate the RTT between the unknown WLAN device 102 and the reference WLAN device 104 ("RTT associated with the reference WLAN device") as the elapsed time between transmitting the control messages and receiving the corresponding response control messages, as will further be described in blocks 304-308 of FIG. 3. Likewise, the location calculation unit 110 can also calculate the RTT associated with the reference WLAN device 106 and the RTT associated with the reference WLAN device 108. It is noted that in other implementations, other suitable techniques can be employed to determine the RTT associated with the reference WLAN devices 104, 106, 108, and 112.

At stage B, the location calculation unit 110 calculates the distance between the unknown WLAN device 102 and each of the reference WLAN devices 104, 106, 108, and 112 based on the corresponding RTT associated with the reference WLAN devices. Operations for calculating the distance between the unknown WLAN device 102 and each of the reference WLAN devices 104, 106, 108, and 112 will further be described in FIGS. 2 and 3.

At stage C, the location calculation unit 110 determines the location of each of the reference WLAN devices 104, 106, 108, and 112. In some implementations, the location calculation unit 110 can request and receive location coordinates associated with each of the reference WLAN devices 104, 106, 108, and 112. For example, the location calculation unit 110 can transmit a request for the location coordinates in the control messages transmitted at stage A and can receive the location coordinates in the response control messages. As another example, the location calculation unit 110 can transmit a location request message (distinct from the control messages transmitted at stage A) to each of the reference WLAN devices and can receive a corresponding location response message comprising the location coordinates associated with each of the reference WLAN devices. In another implementation, the location calculation unit 110 can query a centralized server (or can access a predetermined memory location) to determine the location coordinates associated with the reference WLAN devices 104, 106, 108, and 112. In another implementation, the reference WLAN devices 104, 106, 108, and 112 may broadcast their respective location coordinates at periodic intervals (e.g., in a beacon message or another suitable control message). The location calculation unit 110 can determine the location coordinates associated with the reference WLAN devices 104, 106, 108, and 112 based on receiving and analyzing the periodically received messages. It is noted that the location calculation unit 110 can determine two-dimensional (2-D) coordinates (e.g., X and Y coordinates), three-dimensional (3-D) coordinates (e.g., X, Y, and Z coordinates), latitudes and longitudes, spherical coordinates, and/or other suitable location indicators associated with the reference WLAN devices 104, 106, 108, and 112.

At stage D, the location calculation unit 110 calculates an initial location of the unknown WLAN device 102 based, at least in part, on the location of each of the reference WLAN devices 104, 106, 108, and 112. As one example, the location calculation unit 110 can calculate the initial location of the unknown WLAN device 102 as the average of the known locations of the reference WLAN devices 104, 106, 108, and 112, as will be described in FIGS. 2 and 3. The location calculation unit 110 can use the calculated initial location of the unknown WLAN device 102 as an input to a first time of arrival (TOA1) positioning algorithm to estimate the location of the unknown WLAN device 102, as will be described below in stage F and in FIGS. 2-3. In some implementations (e.g., in the hybrid TOA positioning system), the location calculation unit 110 can use the previously calculated location of the unknown WLAN device output (referred to herein as the "first intermediate location of the unknown WLAN device") generated at the output of the TOA1 positioning algorithm to calculate a second intermediate location of the unknown WLAN device 102 based, at least in part, on the known locations of the reference WLAN devices 104, 106, 108, and 112, and the RTT associated with the reference WLAN devices 104, 106, 108, and 112, as will be described in FIGS. 4-6. In this implementation, the location calculation unit 110 can use the second intermediate location of the unknown WLAN device 102 as an input to a second time of arrival (TOA2) positioning algorithm to determine the estimated location of the unknown WLAN device 102, as will be described below in stage F and in FIGS. 4-7.

At stage E, the location calculation unit 110 determines a distance calibration constant. In some implementations, as will be described in accordance with FIG. 2, the initial distance calibration constant can be a predetermined value or a randomly selected value. The location calculation unit 110 can use the initial distance calibration constant as an input to the TOA1 positioning algorithm to estimate the location of the unknown WLAN device 102 and a distance calibration constant, as will be described below in stage F and in FIGS. 2-3. In other implementations, the location calculation unit 110 can use the distance calibration constant at the output of the TOA1 positioning algorithm (referred to herein as "intermediate distance calibration constant) to calculate a target (or estimated) distance calibration constant. In this implementation, the location calculation unit 110 can use the target distance calibration constant as an input to the TOA2 positioning algorithm to estimate the location of the unknown WLAN device 102, as will be described below in stage F and in FIGS. 4-7.

At stage F, the location calculation unit 110 estimates the location of the unknown WLAN device 102 based, at least in part, on the initial location of the unknown WLAN device 102, the distance calibration constant, and the distance to each of the reference WLAN devices 104, 106, 108, and 112. In some implementations, as will be described in FIGS. 2-3, calculating the location of the unknown WLAN device 102 can be a one-stage process. In this implementation, the location of the unknown WLAN device 102 can be calculated by executing a single iteration of a Taylor series-based TOA1 positioning algorithm using at least the calculated initial location of the unknown WLAN device 102, and the known locations of the reference WLAN devices as inputs. In some implementations, as will be described in FIGS. 5-7, calculating the location of the unknown WLAN device 102 can be a two-stage process. In this implementation, the location calculation unit 110 can first execute the Taylor series based TOA1 positioning algorithm (as described above) and determine a first intermediate location of the unknown WLAN device 102. Furthermore, the TOA1 positioning algorithm can also be used to determine an intermediate distance calibration constant. Next, the location calculation unit 110 can determine the second intermediate location of the unknown WLAN device 102 (as described in stage D) and the target distance calibration constant (as described above in stage E) based on the first intermediate location and the intermediate distance calibration constant. The location calculation unit 110 can then iteratively execute a Taylor series-based TOA2 positioning algorithm to estimate the location of the unknown WLAN device 102.

Figure 2:
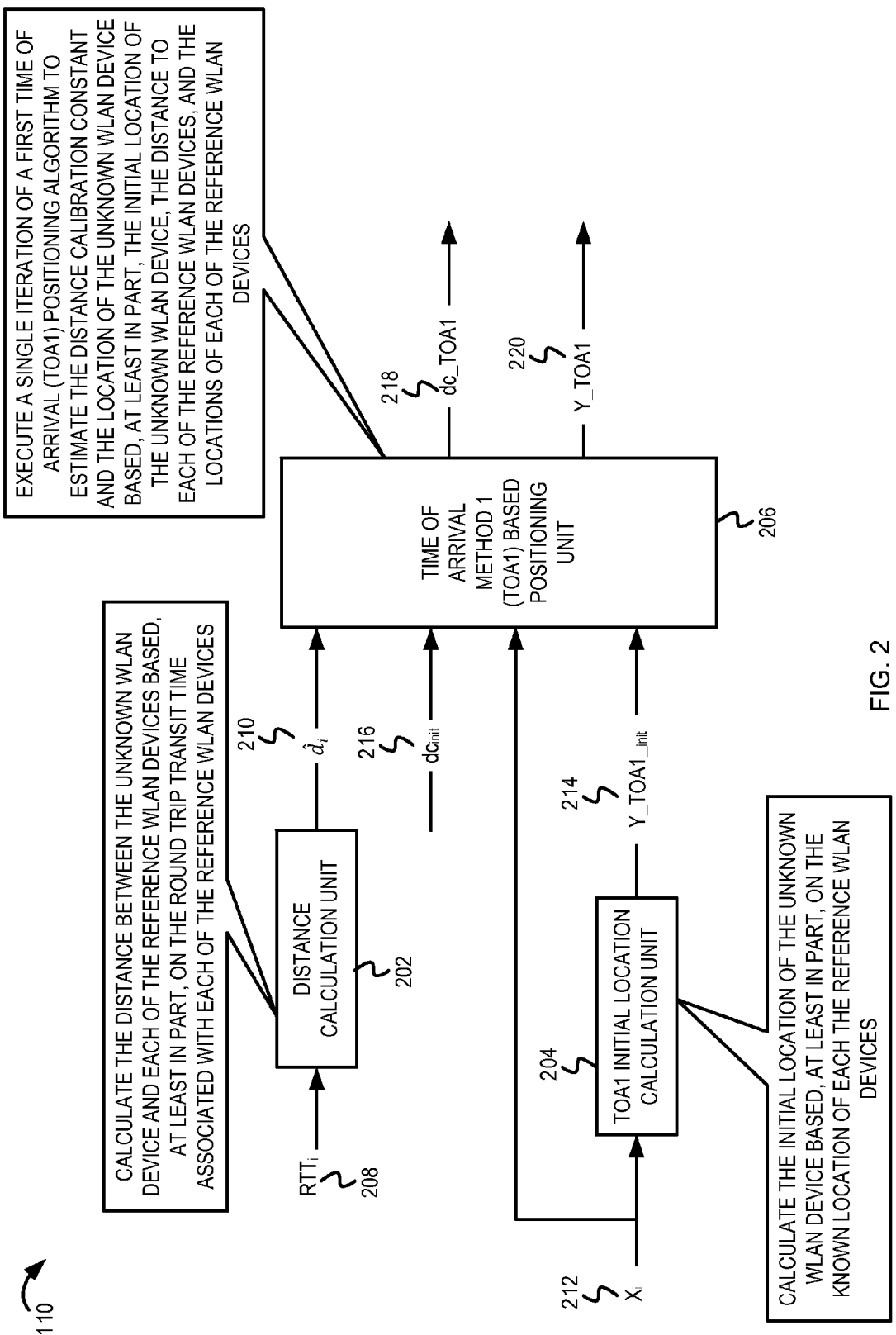
FIG. 2 is an example block diagram of one embodiment of the location calculation unit including a TOA positioning mechanism.

FIG. 2 is an example block diagram of one embodiment of the location calculation unit 110 including a TOA positioning mechanism. The location calculation unit 110 comprises a distance calculation unit 202, a TOA1 initial location calculation unit 204, and a TOA1 positioning unit 206. The distance calculation unit 202 and the TOA1 initial location calculation unit 204 are coupled with the TOA1 positioning unit 206.

The distance calculation unit 202 can calculate the distance between the unknown WLAN device 102 and each of the reference WLAN devices 104, 106, 108, and 112 based, at least in part, on the round-trip transit time (RTT) associated with each of the reference WLAN devices. As depicted in FIG. 2, the distance calculation unit 202 takes as an input parameter, the RTT 208 between the unknown WLAN device 102 and each of the reference WLAN devices 104, 106, 108, and 112. If i represents a counter for the each of the reference WLAN devices and N represents the number of reference WLAN devices in the communication network 100, then the input to the distance calculation unit 202 is $RTT_i$ (i.e., $RTT_1$, $RTT_2$, . . . , $RTT_N$) as depicted in FIG. 2. The output of the distance calculation unit 202 is the estimated distance 210 ($\hat{d}_i$) between the unknown WLAN device 102 and the $i^{th}$ reference WLAN device. Thus, if $RTT_i$ represents the RTT associated with the $i^{th}$ reference WLAN device and c represents the speed of light, the distance $\hat{d}_i$ 210 can be calculated in accordance with Eq. 1a. It is noted that the actual distance ($d_i$) between the unknown WLAN device 102 and the $i^{th}$ reference WLAN device can be represented as the sum of a TOA1 distance calibration constant ($d_{c\_TOA1}$) and the estimated distance ($d_i$) between the unknown WLAN device 102 station and the $i^{th}$ reference WLAN device, as depicted in Eq. 1b.

$$\hat{d}_i = c \times \frac{RTT_i}{2} \qquad \text{Eq. 1a}$$

$$d_i = \hat{d}_i + d_{c\_TOA1} \qquad \text{Eq. 1b}$$

The distance calibration constant ($d_{c\_TOA1}$) can represent the difference between the estimated distance ($\hat{d}_i$) and the actual distance ($d_i$) and may be indicative of the internal processing time (or turnaround time) associated with the reference WLAN devices. For example, the distance calibration constant can account for the elapsed time between the reference WLAN device detecting a control message from the unknown WLAN device 102 and the reference WLAN device transmitting a response control message to the unknown WLAN device 102. The distance calibration constant may also depend on the type and configuration of the reference WLAN devices. In some implementations, the distance calibration constant may differ from one reference WLAN device to another, while in other implementations the distance calibration constant may not differ across the reference WLAN devices.

The TOA1 initial location calculation unit 204 can calculate the initial location of the unknown WLAN device 102 based, at least in part, on the location 212 of each of the reference WLAN devices 104, 106, 108, and 112. As depicted in FIG. 2, the known locations 212 of the reference WLAN devices 104, 106, 108, and 112 are provided as input parameters to the TOA1 initial location calculation unit 204. As described herein, i represents a counter for the reference WLAN devices and $X_i$ represents the location 212 (e.g., also referred to as absolute location, actual location, or real location) of the $i^{th}$ reference WLAN device. In one implementation, the location of the $i^{th}$ reference WLAN device can be represented in the form, $X_i = \{x_i^s, s=0, 1, \ldots, D-1\}$, where D represents the dimension of the coordinate system used to specify the location of the reference WLAN device (e.g., if the location of the reference WLAN devices is specified in terms of X, Y, and Z coordinates, then D=3), s represents a counter for the dimension of the coordinate system (i.e., the dimension index), and $x_i^s$ represents the value of the $s^{th}$ dimension of the location of the $i^{th}$ reference WLAN device. It is noted that the location of the reference WLAN devices can be expressed using other suitable coordinate system (e.g., Cartesian coordinates, spherical coordinates, geodesic coordinates, etc.). Furthermore, the location of the reference WLAN devices can be expressed in other suitable number of dimensions (e.g., 2-dimensional coordinates, 3-dimensional coordinates, etc.) As depicted in FIG. 2, the output of the TOA1 initial location calculation unit 204 is the initial location ($Y_{TOA1_{init}}$) 214 of the unknown WLAN device 102. In one implementation, the initial location of the unknown WLAN device 102 can be represented as $Y_{TOA1_{init}} = \{y_{TOA1_{init}}^s, s=0, 1, \ldots, D-1\}$, where $y_{TOA1_{init}}^s$ represents the value of the $s^{th}$ dimension of the initial location of the unknown WLAN device 102. In some implementations, the initial location 214 of the unknown WLAN device 102 can be expressed as a function $f(.)$ of the known locations 212 of the N reference WLAN devices, as depicted in Eq. 2a. In some implementations, the initial location 214 of the unknown WLAN device 102 can be calculated as an average of the known locations 212 of the reference WLAN devices, as depicted in Eq. 2b. In another implementation, the initial location 214 of the unknown WLAN device 102 can be calculated by maximizing the determinant of a product of matrices generated during the execution of a Taylor series based TOA1 positioning algorithm, as depicted in Eq. 2c. Maximizing the expression $det(B_{TOA1}^T B_{TOA1})$ as depicted in Eq. 2c can ensure that the TOA1 positioning algorithm (described below) converges to the location of the unknown WLAN device 102. In Eq. 2c, $B_{TOA1}^T$ represents the transpose of the $B_{TOA1}$ matrix and the $B_{TOA1}$ matrix will further be described below with reference to Exp. 11 of FIG. 2 and with reference to FIG. 3.

$$Y_{TOA1_{init}} = f(X_0, X_1, \ldots X_{N-1}) \qquad \text{Eq. 2a}$$

$$Y_{TOA1_{init}} = f(X_0, X_1, \ldots X_{N-1}) = \frac{1}{N}\sum_{i=0}^{N-1} X_i \qquad \text{Eq. 2b}$$

$$Y_{TOA1_{init}} = f(X_0, X_1, \ldots X_{N-1}) = \max_{Y_{TOA1_{init}}} \{det(B_{TOA1}^T B_{TOA1})\} \qquad \text{Eq. 2c}$$

It is noted that in other implementations, the TOA1 initial location calculation unit 204 can employ other suitable techniques to calculate the initial location 214 of the unknown WLAN device 102. For example, the initial location 214 of the unknown WLAN device 102 can be calculated as a weighted average of the known locations 212 of the reference WLAN devices, where the weights are selected based on the confidence of the location of the reference WLAN devices and/or based the distance between the reference WLAN devices and the unknown WLAN device 102. As another example, the initial location 214 of the unknown WLAN device 102 can be calculated as a weighted (or non-weighted) combination of the known locations 212 of only a subset of the reference WLAN devices.

The TOA1 positioning unit 206 can execute a single iteration of a Taylor series based TOA1 positioning algorithm to calculate the location 220 of the unknown WLAN device 102 and to estimate a distance calibration constant 218 based, at least in part, on the initial location 214 of the unknown WLAN device 102, the estimated distances 210 to each of the reference WLAN devices, and the location 212 of each of the reference WLAN devices. As depicted in FIG. 2, the estimated distances 210 between the unknown WLAN device 102 and each of the reference WLAN devices (calculated by the distance calculation unit 202) are provided as one set of inputs to the TOA1 positioning unit 206. The initial location 214 of the unknown WLAN device 102 ($Y_{TOA1_{init}}$) calculated by the TOA1 initial location calculation unit 204 is provided as another input to the TOA1 positioning unit 206. The known locations 212 ($X_i$) of the reference WLAN devices 104, 106, 108, and 112 are also provided as an input to the TOA1 positioning unit 206. Additionally, an initial distance calibration constant ($d_{c_{init}}$) 216 can also be provided as an input to the TOA1 positioning unit 206. As described above, the initial distance calibration constant 216 may be indicative of internal processing time (or turnaround time) associated with the reference WLAN devices. In some implementations, the initial distance calibration constant 216 may be selected to be zero, while in other implementations the initial distance calibration constant 216 may be selected to be another suitable random value. In some implementations, the initial distance calibration constant 216 may be preconfigured, while in other implementations the initial distance calibration constant 216 may be dynamically selected (e.g., a random value may be dynamically selected for the initial distance calibration constant 216).

The TOA1 positioning unit 206 can then execute one iteration of a Taylor series based TOA1 positioning algorithm to solve the expression depicted by Eq. 3a and to estimate the location ($Y_{TOA1}$) 220 of the unknown WLAN device 102. In accordance with Eq. 3a, the TOA1 positioning unit 206 can attempt to identify the value of $Y_{TOA1}$ that minimizes the sum (across all the reference WLAN devices) of the estimation error between A) the measured distance to the $i^{th}$ reference WLAN device determined in Eq. 1 based on the RTT associated with the $i^{th}$ reference WLAN device and B) the estimated distance to the $i^{th}$ reference WLAN device based on the known location of the $i^{th}$ reference WLAN device. In Eq., 3a, $\|X_i - Y_{TOA1}\|$ represents the estimated distance between the $i^{th}$ reference WLAN device and the unknown WLAN device 102. $\|X_i - Y_{TOA1}\|$ can be calculated in accordance with Eq. 3b. The estimated distance between a reference WLAN device and the unknown WLAN device can be determined based on the actual location of the reference WLAN device and the estimated location ($Y_{TOA1}$) of the unknown WLAN device.

$$Y_{TOA1} = \arg\min_{Y_{TOA1}} \left\{ \sum_{i=0}^{N-1} (\hat{d}_i + d_{c\_TOA1} - \|X_i - Y_{TOA1}\|) \right\} \quad \text{Eq. 3a}$$

$$\|X_i - Y_{TOA1}\| = \left[ \sum_{s=0}^{D-1} (x_i^s - y_{TOA1}^s)^2 \right]^{\frac{1}{2}} \quad \text{Eq. 3b}$$

In some implementations, by assuming that there is no estimation error {e.g., by assuming that $(\hat{d}_i + d_{c\_TOA1} - \|X_i - Y_{TOA1}\|) = 0$}, the TOA1 positioning unit 206 can simplify Eq. 3a and can instead solve Eq. 4 for all values of i to estimate the location of the unknown WLAN device 102.

$$\hat{d}_i = \|X_i - Y_{TOA1}\| - d_{c\_TOA1} \quad \text{Eq. 4}$$

The TOA1 distance calibration constant ($d_{c\_TOA1}$) 218 can be expressed as the sum of the initial distance calibration constant ($d_{c_{init}}$) 216 and a distance calibration error ($\Delta d_c$), as depicted in Eq. 5a. In other words, the distance calibration error ($\Delta d_c$) can be expressed as the difference (or error) between the estimated distance calibration constant ($d_{c\_TOA1}$) 218 and the initial distance calibration constant ($d_{c_{init}}$) 216. Likewise, the location 220 of the unknown WLAN device 102 ($Y_{TOA1}$) can be expressed as the sum of the initial location 214 of the unknown WLAN device ($Y_{TOA1_{init}}$) and a TOA1 location error ($\Delta Y_{TOA1}$), as depicted in Eq. 5b. In other words, the TOA1 location error ($\Delta Y_{TOA1}$) can be expressed as the difference (or error) between the estimated location 220 of the unknown WLAN device 102 ($Y_{TOA1}$) and the initial location 214 of the unknown WLAN device ($Y_{TOA1_{init}}$). It is noted that in some implementations, the TOA1 location error can be represented as $\Delta Y_{TOA1} = \{\Delta y_{TOA1}^s, s=0, 1, \ldots, D-1\}$, where D represents the dimension of the coordinate system and $\Delta y_{TOA1}^s$ represents the value of the $s^{th}$ dimension of the TOA1 location error. The TOA1 positioning unit 206 can substitute Eq. 5a and Eq. 5b into Eq. 4 to yield Eq. 6.

$$d_{c_{TOA1}} = d_{c_{init}} + \Delta d_c \quad \text{Eq. 5a}$$

$$Y_{TOA1} = Y_{TOA1_{init}} + \Delta Y_{TOA1} \quad \text{Eq. 5b}$$

$$\hat{d}_i = \|X_i - Y_{TOA1_{init}} - \Delta Y_{TOA1}\| - d_{c_{init}} - \Delta d_c \quad \text{Eq. 6}$$

The TOA1 positioning unit 206 can then use Taylor series expansion and neglect the second and higher order terms (e.g., because the higher order terms have a zero or negligible value), to yield Eq. 7. The TOA1 positioning unit 206 can generate an equation in accordance with Eq. 7 for each of the reference WLAN devices 104, 106, 108, and 112 and can organize the plurality of generated equations in matrix form to yield Eq. 8.

$$\hat{d}_i = \|X_i - Y_{TOA1_{init}}\| - d_{c_{init}} + \sum_{s=0}^{D-1} \left( -\frac{x_i^s - y_{TOA1_{init}}^s}{\|X_i - Y_{TOA1_{init}}\|} \right) \Delta y_{TOA1}^s - \Delta d_c \quad \text{Eq. 7}$$

$$A_{ToA1} = B_{ToA1} [\Delta Y_{TOA1} \Delta d_c]^T \quad \text{Eq. 8}$$

In some implementations, the TOA1 location error matrix ($\Delta Y_{TOA1}$) may be a 1×D row matrix that can represent the difference between the estimated location of the unknown WLAN device 102 and the initial TOA1 location of the unknown WLAN device 102 as depicted in Exp 9. The TOA1 distance error matrix ($A_{ToA1}$) can be an N×1 column matrix, where each element (i.e., each row) of the $A_{ToA1}$ matrix is represented by Exp. 10 and each row is associated with one of the reference WLAN devices. As depicted by Exp. 10, each element of the TOA1 distance error matrix represents a combination of A) the estimated distance between the unknown WLAN device and a reference WLAN device (e.g., based on RTT associated with the reference WLAN device as depicted in Eq. 1), B) the initial distance calibration constant 216, and C) the estimated distance between the unknown WLAN device and the reference WLAN device based on the known location of the reference WLAN device and the initial location 214 of the unknown WLAN device 102. The TOA coefficient matrix ($B_{ToA1}$) can be an N×(D+1) matrix, where N represents the number of reference WLAN devices and D represents the dimensions of the coordinate system that is used to specify the location of the reference WLAN devices. Each element of the TOA1 coefficient matrix can be represented in accordance with Exp. 11. The TOA1 coefficient matrix ($B_{TOA1}$) can comprise the coefficients of the TOA1 location error matrix ($\Delta Y_{ToA1}$) and can represent the relationship between the TOA1 location error matrix ($\Delta Y_{TOA1}$) and the TOA1 distance error matrix ($\Delta_{ToA1}$).

$$\Delta Y_{TOA1} = [\Delta y_{TOA1}^0 \Delta y_{TOA1}^1 \ldots \Delta y_{TOA1}^{D-2} \Delta y_{TOA1}^{D-1}] \quad \text{Exp. 9}$$

$$i^{th} \text{ element of } A_{ToA1} : \hat{d}_i + d_{c_{init}} - \|X_i - Y_{TOA1_{init}}\| \quad \text{Exp. 10}$$

$$(i, s)^{th} \text{ element of } B_{ToA1} : -\frac{x_i^s - y_{TOA1_{init}}^s}{\|X_i - Y_{TOA1_{init}}\|} \quad \text{Exp. 11}$$

In one implementation, the dimension (e.g., the value of s) can vary from column to column while the reference device under consideration (e.g., the value of i) can vary from row to row. The dimension can remain constant throughout a particular column while the reference device under consideration can remain constant throughout a particular row. The TOA1 positioning unit 206 can then calculate the TOA1 location error $\Delta Y_{TOA1}$ and the distance calibration error $\Delta d_c$ in accordance with Eq. 12. It is noted that in some implementations, prior to evaluating Eq. 12, the TOA1 positioning unit 206 may first determine whether the condition $\det(B_{TOA1}^T B_{TOA1}) \neq 0$ is satisfied to ensure convergence of the Taylor series based TOA1 positioning algorithm.

$$[\Delta Y_{TOA} \Delta d_c] T = (B_{ToA1}^T B_{ToA1})^{-1} B_{ToA1}^T A_{ToA1} \quad \text{Eq. 12}$$

After the TOA1 positioning unit 206 calculates the value of TOA1 location error and the distance calibration error (in accordance with Eq. 12), the TOA1 positioning unit 206 can use Eq. 5a to calculate the TOA1 distance calibration constant ($d_{c\_TOA1}$) 218 by summing the distance calibration error ($\Delta d_c$) with the initial distance calibration constant ($d_{C_{init}}$). Likewise, the TOA1 positioning unit 206 can use Eq. 5b to calculate the estimated location 220 of the unknown WLAN device ($Y_{TOA1}$) by summing the TOA1 location error ($\Delta Y_{TOA1}$) with the initial location 214 of the unknown WLAN device 102 ($Y_{TOA1_{init}}$). In one implementation, the location 220 of the unknown WLAN device 102 at the output of the TOA1 positioning unit 206 can be represented as $Y_{TOA1} = \{y_{TOA1}^s, s=0, 1, \ldots, D-1\}$, where $y_{TOA1}^s$ represents the value of the $s^{th}$ dimension of the location of the unknown WLAN device 102. It is noted that the TOA1 positioning unit 206 may execute the operations described herein with reference to Eq. 3a-Eq. 12 only once (i.e., only one iteration) to calculate the estimated location of the unknown WLAN device 102.

Figure 3:
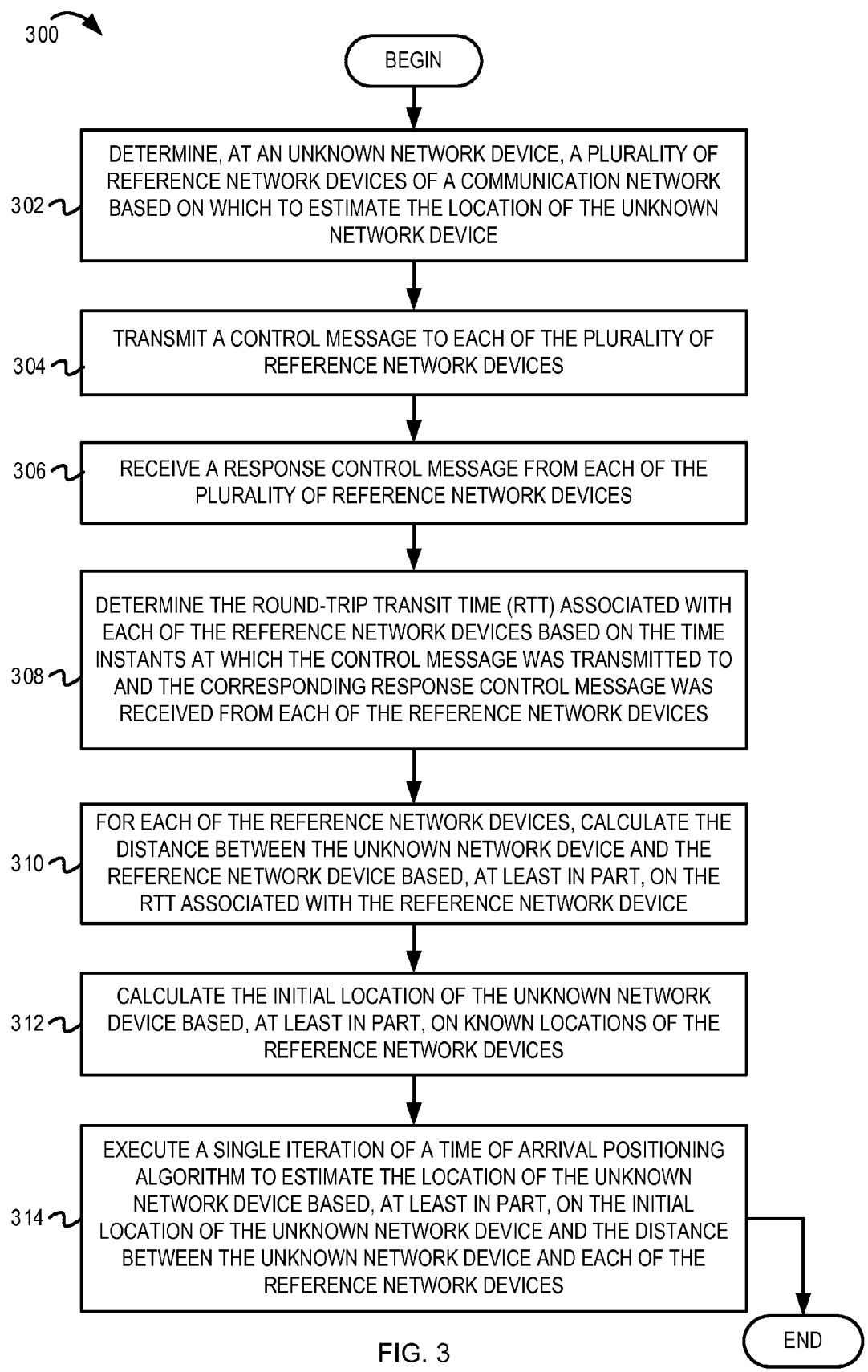
FIG. 3 is a flow diagram illustrating example operations of a TOA positioning mechanism.

FIG. 3 depicts a flow diagram ("flow") 300 illustrating example operations of a TOA positioning mechanism. The flow 300 begins at block 302.

At block 302, an unknown network device determines a plurality of reference network devices of a communication network based on which to estimate the location of the unknown network device. With reference to the example of FIG. 1, the location calculation unit 110 of the unknown WLAN device 102 can identify the reference WLAN devices 104, 106, 108, and 112 based on which to estimate the location of the unknown WLAN device 102. In some implementations, the location calculation unit 110 can identify the reference WLAN devices 104, 106, 108, and 112 from a plurality of WLAN devices in the wireless communication network 100 based on analyzing one or more performance measurements associated with the plurality of WLAN devices. For example, location calculation unit 110 can identify N WLAN devices in the wireless communication network 100 with the highest received signal strength indicator (RSSI), the lowest packet error rate (PER), etc. In some implementations, if the wireless communication network 100 comprises a plurality of access points, the access points may advertise (e.g., in a beacon message) their presence/location to other WLAN devices in the wireless communication network 100. The location calculation unit 110 can detect these beacon messages, identify the access points that transmitted the beacon messages, and select at least a subset of the access points as reference WLAN devices (e.g., based on analyzing the performance measurements associated with the beacon messages received from each of the access points). The flow continues at block 304.

At block 304, a control message is transmitted to each of the plurality of reference network devices. For example, the location calculation unit 110 can transmit a control message to the reference WLAN device 104. The control message can comprise one or more of an identifier associated with the unknown WLAN device 102, an identifier associated with the reference WLAN device 104, and a suitable payload (e.g., a predetermined combination of symbols, a NULL payload, etc.). The location calculation unit 110 can also record the time instant at which the control message was transmitted to the reference WLAN device 104. Likewise, with reference to FIG. 1, the location calculation unit 110 can also record the time instants at which control messages were transmitted to the reference WLAN devices 106, 108, and 112. The flow continues at block 306.

At block 306, a response control message is received from each of the plurality of reference network devices. For example, the location calculation unit 110 can receive the response control message from the reference WLAN device 104. The response control message can be a WLAN acknowledgment (ACK) message or any suitable message that indicate receipt of the control message (transmitted at block 304) at the reference WLAN device 104. The location calculation unit 110 can also record the time instant at which the response control message was received at the unknown WLAN device 102 from the WLAN device 104. Likewise, with reference to FIG. 1, the location calculation unit 110 can also record the time instants at which response control messages were received from the reference WLAN devices 106, 108, and 112. The flow continues at block 308.

At block 308, the round-trip transit time (RTT) associated with each of the reference network devices is determined. In one implementation, the location calculation unit 110 can determine the RTT associated with the reference WLAN device 104 based on the time instants at which the control message was transmitted to the reference WLAN device 104 (recorded at block 304) and the time instant at which the response control message was received from the reference network device 104 (recorded at block 306). The location calculation unit 110 can compute the RTT associated with the reference WLAN device 104 by subtracting the time instant at which the control message was transmitted from the time instant at which the response control message was received. It is noted that in other implementations, the location calculation unit 110 can employ other suitable techniques to determine the RTT associated with the reference WLAN device 104. Likewise, with reference to FIG. 1, the location calculation unit 110 can also determine the RTT associated with the reference WLAN devices 106, 108, and 112. The flow continues at block 310.

At block 310, for each of the plurality of reference network devices, the distance between the unknown network device and the reference network device is calculated based, at least in part, on the RTT associated with the reference network device. For example, the location calculation unit 110 (e.g., the distance calculation unit 202 of FIG. 2) can calculate the distance between the unknown WLAN device 102 and each of the reference network devices 104, 106, 108, and 112 based, at least in part, on the RTT associated with the corresponding reference WLAN device as described above with reference to Eq. 1a of FIG. 2. It is noted that in other implementations, the distance calculation unit 202 can use other suitable techniques to determine the distance between the unknown WLAN device 102 and each of the reference WLAN devices 104, 106, 108, and 112. The flow continues at block 312.

At block 312, the initial location of the unknown network device is calculated based, at least in part, on known locations of the reference network devices. For example, location calculation unit 110 (e.g., the TOA1 initial location calculation unit 204 of FIG. 2) can calculate the initial location 214 of the unknown WLAN device 102. As described above with reference to Eq. 2a, the initial location 214 of the unknown WLAN device 102 can be calculated as a function of the location 212 of the reference WLAN devices. In some examples, as described above in Eq. 2b, the initial location of the unknown WLAN device 102 can be calculated as an average of the locations of the reference WLAN devices. In other examples, as described above in Eq. 2c, the initial location of the unknown WLAN device 102 can be calculated as another suitable weighted (or non-weighted) combination of the locations of the reference WLAN devices. More specifically, as described above in FIG. 2, the location calculation unit 110 can determine the TOA1 location error matrix ($\Delta Y_{TOA1}$) such that each element of the TOA1 location error matrix represents the difference between a coordinate of the estimated location of the unknown WLAN device (e.g., the estimated X-coordinate) and an initial location coordinate of the initial location of the unknown WLAN device 102 (e.g., the X-coordinate of the initial location of the unknown WLAN device 102). The location calculation unit 110 can calculate the TOA1 distance error matrix ($A_{ToA1}$) in accordance with Exp. 10. The location calculation unit 110 can then calculate the TOA1 coefficient matrix ($B_{TOA1}$) in accordance with Exp 11. The location calculation unit 110 can calculate the initial location of the wireless network device based, at least in part, on maximizing the determinant of the product of the $B_{TOA1}$ matrix and a transpose of the $B_{TOA1}$ matrix, as depicted in Eq. 2b. The flow continues at block 314.

At block 314, a single iteration of a first time of arrival (TOA1) positioning algorithm is executed to estimated location of the unknown network device based, at least in part, on the initial location of the unknown network device and the distance between the unknown network device and each of the reference network devices. For example, the location calculation unit 110 (e.g., the TOA1 positioning unit 206 of FIG. 2) can execute a single iteration of a Taylor series based TOA1 positioning algorithm to calculate the location of the unknown WLAN device 102. In addition, the TOA1 positioning unit 206 can also receive (as an input) an initial distance calibration constant 216. As described above in FIG. 2, the initial distance calibration constant 216 can be zero, a predetermined value, or a randomly selected value. As described above in Eq. 3a-Eq. 12, the TOA1 positioning unit 206 can use the initial location 214 of the unknown WLAN device 102 (determined at block 312), the distance 210 to each of reference WLAN devices (determined at block 310), the initial distance calibration constant 216, and the known locations 212 of the reference WLAN devices as inputs to execute a single iteration of the Taylor series based TOA1 positioning algorithm and to calculate the location of the unknown WLAN device 102. Therefore, the TOA1 positioning unit 206 can also determine a TOA1 distance calibration constant 218 based, at least in part, on the initial distance calibration constant 216 (described above) by executing the single iteration of the Taylor series based TOA1 positioning algorithm. It is noted that in other embodiments, the TOA1 positioning unit 206 can employ other suitable techniques to estimate the location of the unknown WLAN device 102 based, at least in part, on the calculated initial location 214 of the unknown WLAN device 102 (e.g., as will be further described below). From block 314, the flow ends.

Figure 4:
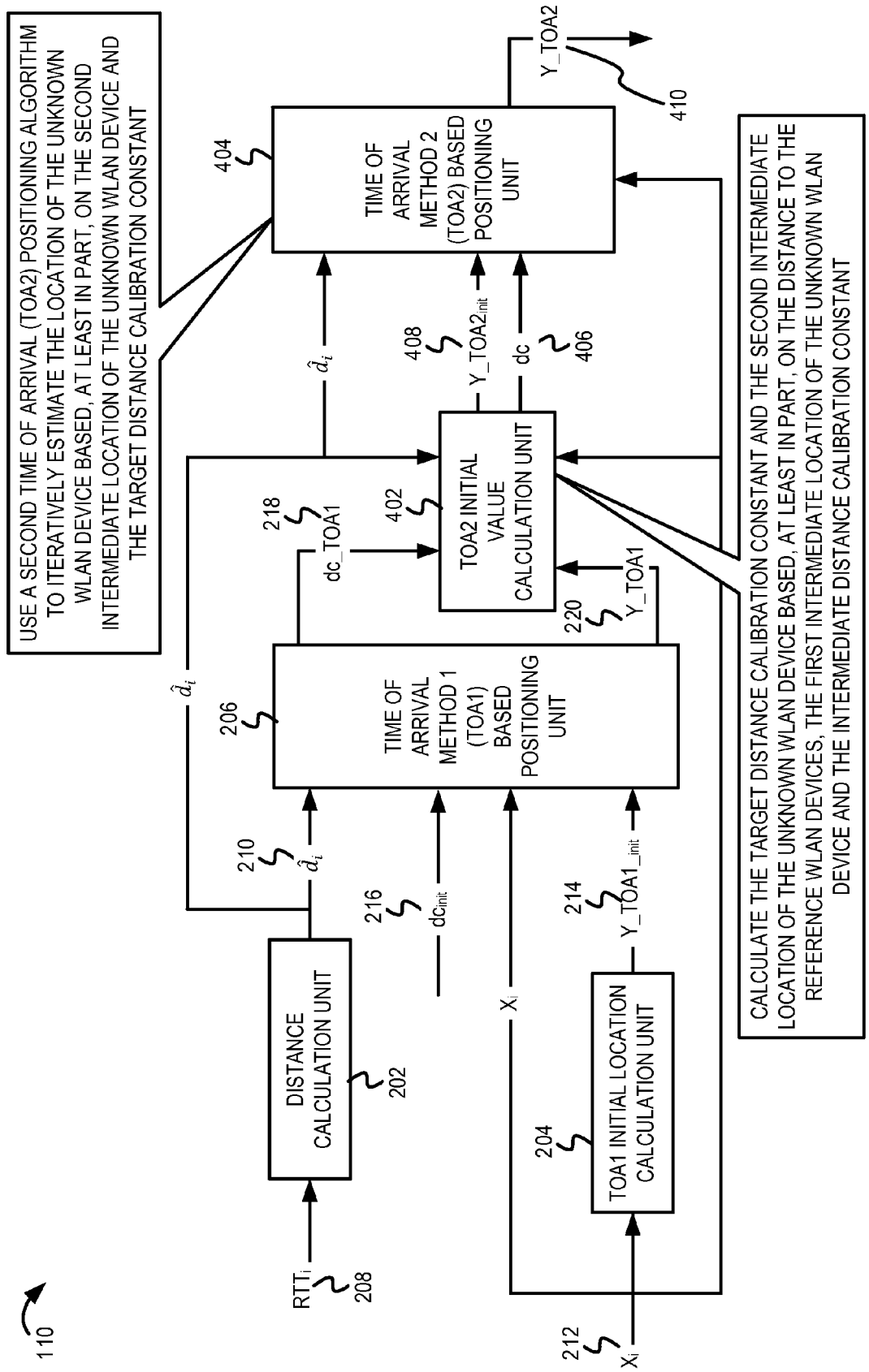
FIG. 4 is an example block diagram of one embodiment of the location calculation unit including a hybrid TOA positioning mechanism.

FIG. 4 is an example block diagram of one embodiment of the location calculation unit 110 including a hybrid TOA positioning mechanism. The location calculation unit 110 comprises the distance calculation unit 202, the TOA1 initial location calculation unit 204, and the TOA1 positioning unit 206 previously described in FIGS. 2-3. Additionally, the location calculation unit 110 also comprises a TOA2 initial value calculation unit 402 and a TOA2 positioning unit 404. As shown in the example of FIG. 4, the distance calculation unit 202 and the TOA1 initial location calculation unit 204 are coupled with the TOA1 positioning unit 206. The TOA1 positioning unit 206 and the distance calculation unit 202 are coupled with the TOA2 initial value calculation unit 402. The distance calculation unit 202 and the TOA2 initial value calculation unit 402 are coupled with the TOA2 positioning unit 404.

The distance calculation unit 202 can calculate the distance 210 between the unknown WLAN device 102 and each of the reference WLAN devices 104, 106, 108, and 112 based, at least in part, on the corresponding RTT 208 associated with the reference WLAN devices, as described above in accordance with Eq. 1a of FIG. 2. The TOA1 initial location calculation unit 204 can calculate the initial location 214 of the unknown WLAN device 102 based, at least in part, on the location 212 of each of the reference WLAN devices 104, 106, 108, and 112, as described above in accordance with Eq. 2a, Eq. 2b, and Eq. 2c of FIG. 2. The TOA1 positioning unit 206 can employ a single iteration of the Taylor series based TOA1 positioning algorithm to estimate the TOA1 location 220 of the unknown WLAN device 102 and the distance calibration constant 218 based, at least in part, on the initial location 212 of the unknown WLAN device 102, the initial distance calibration constant 216, and the distances 210, as described above in accordance with Eq. 3a-Eq. 12 of FIG. 2. In the hybrid TOA mechanism, the distance calibration constant 218 and the location 220 at the output of the TOA1 positioning unit 206 can be referred to as "intermediate distance calibration constant" and "first intermediate location of the unknown WLAN device" respectively.

The TOA2 initial value calculation unit 402 can calculate a distance calibration constant ("target distance calibration constant") and an initial location ("second intermediate location of the unknown WLAN device") that will be provided as inputs to the TOA2 positioning unit 404. The TOA2 initial value calculation unit 402 can calculate the target distance calibration constant and the second intermediate location of the unknown WLAN device based, at least in part, on the estimated distances ($\hat{d}_i$) 210 to each of the reference WLAN devices 104, 106, 108, and 112 (determined by the distance calculation unit 202), the first intermediate location ($Y_{TOA1}$) 220 of the unknown WLAN device 102 and the intermediate distance calibration constant 218 (calculated by the TOA1 positioning unit 206). Additionally, the locations ($X_i$) 210 of the reference WLAN devices 104, 106, 108, and 112 are provided as input parameters to the TOA2 initial value calculation unit 402. As depicted in FIG. 4, the TOA2 initial value calculation unit 402 can estimate the target distance calibration constant ($d_r$) 406 and the second intermediate location ($Y_{TOA2_{init}}$) 408 of the unknown WLAN device 102. In some implementations, the target distance calibration constant 406 can be represented as a function g(.) of the intermediate distance calibration constant 218, the first intermediate location 220 of the unknown WLAN device, the known locations 212 of the reference WLAN devices, and the distances 210 to the reference WLAN devices, as depicted in Eq. 13a. In one example, the TOA2 initial value calculation unit 402 can calculate the value of the target distance calibration constant 406 value as the weighted sum of the difference in A) the estimated distance ($\|X_i - Y_{TOA1}\|$) between the unknown WLAN device and the reference WLAN devices based on known locations of the reference WLAN devices and the first intermediate location of the unknown WLAN device, and B) the measured distance between the unknown WLAN device and the reference WLAN device based on the RTT associated with the reference WLAN devices, as depicted by Eq. 13b. As another example, the TOA2 initial value calculation unit 402 can assign the intermediate distance calibration constant 220 as the target distance calibration constant 406, as depicted in accordance with Eq. 13c.

$$d_c = g(d_{c_{TOA1}}, Y_{TOA1}, X_0, X_1, \ldots, X_{N-1}, \hat{a}_0, \hat{a}_1, \ldots, \hat{a}_{N-1}) \quad \text{Eq. 13a}$$

$$d_c = \sum_{i=0}^{N-1} \beta_i (\|X_i - Y_{TOA1}\| - \hat{a}_i) \quad \text{Eq. 13b}$$

$$d_c = d_{c_{TOA1}} \quad \text{Eq. 13c}$$

In Eq. 13b, $\beta_i$ represents the weighting factor associated with each of the reference WLAN devices and can be selected so that each of the weighting factors are greater than or equal to zero and the sum of all the weighting factors equals one. In one example, the weighting factor $\beta_i$ associated with each reference WLAN device can be calculated as the inverse of the number of reference WLAN devices, as depicted by Eq. 13d. In another example, the weighting factor $\beta_i$ associated with each reference WLAN device can be calculated in accordance with Eq. 13e.

$$\beta_i = \frac{1}{N}, i = 0, 1, \ldots, N-1 \quad \text{Eq. 13d}$$

$$\beta_i = \frac{1}{\|X_i - Y_{TOA1}\| \sum_{j=0}^{N-1} \frac{1}{\|X_j - Y_{TOA1}\|}}, i = 0, 1, \ldots, N-1 \quad \text{Eq. 13e}$$

With reference to Eq. 13e, the weighting factor can be determined based on distance measurements to (e.g., the confidence in location of) the reference WLAN devices. In other words, the distance ($\|X_i - Y_{TOA1}\|$) between the unknown WLAN device 102 and the $i^{th}$ reference WLAN device can be used to calculate the weighting factor and can be used as an indication of the confidence in the measurements associated with the $i^{th}$ reference WLAN device. For example, if the reference WLAN device 104 is close to the unknown WLAN device 102, then $\|X_i - Y_{TOA1}\|$ has a small value, its inverse has a large value, and consequently, the reference WLAN device 104 is associated with a higher weighting factor (e.g., higher importance). As another example, if the reference WLAN device 108 is far away from the unknown WLAN device 102, then $\|X_i - Y_{TOA1}\|$ has a large value, its inverse has a small value, and consequently, the reference WLAN device 108 is associated with a small weighting factor (e.g., low importance). The factor $$\sum_{j=0}^{N-1} \frac{1}{\|X_j - Y_{TOA1}\|}$$

is a constant multiplicative factor that is the sum of the inverse of the distance between the unknown WLAN device 102 and each of the reference WLAN devices. It is noted that in other implementations, the TOA2 initial value calculation unit 402 can use other suitable techniques to calculate the weighting factor $\beta_i$ associated with each of the reference WLAN devices.

Additionally, the TOA2 initial value calculation unit 402 also determines the second intermediate location ($Y_{TOA2_{init}}$) 408 of the unknown WLAN device 102 as a function $h(.)$ of the first intermediate location ($Y_{TOA1}$) 220 of the unknown WLAN device 102 (calculated by the TOA1 positioning unit 206) and the locations 210 of the reference WLAN devices, as depicted in Eq. 14a. In some implementations, the second intermediate location 408 of the unknown WLAN device 102 can be calculated as an average of the locations 210 of the reference WLAN devices, as depicted in Eq. 14b. In another implementation, the first intermediate location ($Y_{TOA1}$) 220 of the unknown WLAN device 102 can be designated as the second intermediate location 408 of the unknown WLAN device 102, as depicted in Eq. 14c.

$$Y_{TOA2_{init}} = h(Y_{TOA1}, X_0, X_1, \ldots X_{N-1}) \quad \text{Eq. 14a}$$

$$Y_{TOA2_{init}} = h(Y_{TOA1}, X_0, X_1, \ldots X_{N-1}) = \frac{1}{N} \sum_{i=0}^{N-1} X_i \quad \text{Eq. 14b}$$

$$Y_{TOA2} = h(Y_{TOA1}, X_0, X_1, \ldots X_{N-1}) \quad \text{Eq. 14c}$$

It is noted that in some implementations, the second intermediate location of the unknown WLAN device 102 can be represented as $Y_{TOA2_{init}} = \{y_{TOA2_{init}}^s, s=0, 1, \ldots, D-1\}$, where $y_{TOA2_{init}}^s$ represents the value of the $s^{th}$ dimension of the second intermediate location of the unknown WLAN device 102. It is also noted that in some implementations, the TOA2 initial value calculation unit 402 can employ other suitable techniques to calculate the second intermediate location 408 of the unknown WLAN device 102. For example, the second intermediate location 408 of the unknown WLAN device 102 can be calculated as a weighted average of the locations of the reference WLAN devices where the weights are selected based on the confidence of the location of the reference WLAN devices and/or based the distance between the reference WLAN device and the unknown WLAN device 102. As another example, the second intermediate location 408 of the unknown WLAN device 102 can be calculated as a combination of the first intermediate location ($Y_{TOA1}$) 220 and the locations 212 of the reference WLAN devices.

The TOA2 positioning unit 404 can use a Taylor series based TOA2 positioning algorithm to iteratively calculate the location of the unknown WLAN device 102 based, at least in part, on the second intermediate location 408 of the unknown WLAN device 102, the target distance calibration constant 406, and the distances 210 to the reference WLAN devices 104, 106, 108, and 112. As depicted in FIG. 4, for each reference WLAN device i, the distances 210 calculated by the distance calculation unit 202 are provided as one set of inputs to the TOA2 positioning unit 404. The second intermediate location 408 of the unknown WLAN device 102 and the target distance calibration constant 406 calculated by the TOA2 initial value calculation unit 402 are also provided as inputs to the TOA2 positioning unit 404. Additionally, the known locations 212 of the reference WLAN devices 104, 106, 108, and 112 are also provided as inputs to the TOA2 positioning unit 404. The TOA2 positioning unit 404 can then iteratively execute the expression depicted by Eq. 15 to gradually approach the real location ($Y_{TOA2}$) 410 of the unknown WLAN device 102 after several iterations. In accordance with Eq. 15, the TOA2 positioning unit 404 can attempt to identify the value of $Y_{TOA2}$ that minimizes the sum of the estimation error between A) the measured distance to the $i^{th}$ reference WLAN device determined in Eq. 1 based on the RTT associated with the $i^{th}$ reference WLAN devices and B) the estimated distance to the $i^{th}$ reference WLAN device based on the known location of the $i^{th}$ reference WLAN device. In Eq. 15, $\|X_i - Y_{TOA2}\|$ represents the distance between the location ($X_i$)

of the $i^{th}$ reference WLAN device and the real location (i.e., the $Y_{TOA2}$ location to be determined) of the unknown WLAN device 102.

$$Y_{TOA2} = \arg\min_{Y_{TOA2}} \left\{ \sum_{i=0}^{N-1} (\hat{d}_i + d_c - \|X_i - Y_{TOA2}\|) \right\} \quad \text{Eq. 15}$$

In some implementations, by assuming that there is no estimation error {e.g., by assuming that $(\hat{d}_i+d_c-\|X_i-Y_{TOA2}\|)=0$}, the TOA2 positioning unit 404 can simplify Eq. 15 and can instead solve Eq. 16 for all values of i to estimate the location of the unknown WLAN device 102.

$$\hat{d}_i+d_c=\|X_i-Y_{TOA}\| \quad \text{Eq. 16}$$

The location 410 of the unknown WLAN device 102 ($Y_{TOA2}$) can be expressed as the sum of the second intermediate location 408 of the unknown WLAN device ($Y_{TOA2_{init}}$) and a TOA2 location error ($\Delta Y_{TOA2}$), as depicted in Eq. 17. It is noted that in some implementations, the TOA2 location error can be represented as $\Delta Y_{TOA2}=\{\Delta_{TOA2}^s, s=0, 1, \ldots, D-1\}$, where $\Delta y_{TOA2}^s$ represents the value of the $s^{th}$ dimension of the TOA2 location error. The TOA2 positioning unit 404 can substitute Eq. 17 into Eq. 16 to yield Eq. 18.

$$Y_{TOA2}=Y_{TOA2_{init}}+\Delta Y_{TOA2} \quad \text{Eq. 17}$$

$$\hat{d}_i+d_c=\|X_i-Y_{TOA2_{init}}-\Delta Y_{TOA2}\|, i=0,1,\ldots,N-1 \quad \text{Eq. 18}$$

The TOA2 positioning unit 404 can then use Taylor series expansion and can neglect the second and higher order terms to yield Eq. 19. The TOA2 positioning unit 404 can generate an equation in accordance with Eq. 19 for each of the reference WLAN devices 104, 106, 108, and 112, and can organize the plurality of generated equations in matrix form to yield Eq. 20.

$$\hat{d}_i + d_c = \|X_i - Y_{TOA2_{init}}\| + \sum_{s=0}^{D-1} \left( -\frac{x_i^s - y_{TOA2_{init}}^s}{\|X_i - Y_{TOA2_{init}}\|} \right) \Delta y_{TOA2}^s \quad \text{Eq. 19}$$

$$A_{ToA2}=B_{ToA2}\Delta Y_{TOA2}^T \quad \text{Eq. 20}$$

In some implementations, the matrix $\Delta Y_{TOA2}^T$ may be a D×1 column matrix that represents the transpose of the TOA2 location error matrix (i.e., the difference between the estimated location of the unknown WLAN device 102 and the second intermediate location of the unknown WLAN device 102) associated with the unknown WLAN device 102. As described with reference to FIG. 2, the TOA2 distance error matrix ($A_{ToA2}$) can be an N×1 column matrix, where each element (i.e., each row) of the $A_{ToA2}$ matrix is associated with one of the reference WLAN devices and is represented in accordance with Exp. 21a. The TOA2 coefficient matrix ($B_{ToA2}$) can be an N×D matrix, where N represents the number of reference WLAN devices and D represents the dimensions of the coordinate system that is used to specify the location of the reference WLAN devices. Each element of the N×D $B_{ToA2}$ matrix can be represented by Exp 21b.

$$i^{th} \text{ element of } A_{ToA2}: \hat{d}_i+d_c-\|X_i-Y_{TOA2_{init}}\| \quad \text{Exp. 21a}$$

$$(i, s)^{th} \text{ element of } B_{ToA2}: -\frac{x_i^s - y_{TOA2_{init}}^s}{\|X_i - Y_{TOA2_{init}}\|} \quad \text{Eq. 21b}$$

As described above with reference to FIG. 2, in one implementation, the dimension (e.g., the value of s) can vary from column to column and can remain constant throughout a particular column. The reference device under consideration (e.g., the value of i) can vary from row to row and can remain constant throughout a particular row. The TOA2 positioning unit 404 can then calculate the TOA2 location error $\Delta Y_{TOA2}$ in accordance with Eq. 22.

$$\Delta Y_{TOA2}^T=(B_{ToA2}^T B_{ToA2})^{-1} B_{ToA2}^T A_{ToA2} \quad \text{Eq. 22}$$

The TOA2 positioning unit 404 can then use Eq. 17 to iteratively estimate the location 410 of the unknown WLAN device ($Y_{TOA2}$) by summing the TOA2 location error ($\Delta Y_{TOA2}$) determined in accordance with Eq. 22 with the second intermediate location 408 of the unknown WLAN device 102 ($Y_{TOA2_{init}}$). In one implementation, the location 410 of the unknown WLAN device 102 at the output of the TOA2 positioning unit 404 can be represented as $Y_{TOA2}=\{y_{TOA2}^s, s=0, 1, \ldots, D-1\}$, where represents the value of the $s^{th}$ dimension of the location of the unknown WLAN device.

In the next iteration, the TOA2 positioning unit 404 can use the output of the TOA2 positioning unit 404 calculated at the previous iteration as the initial location of the unknown WLAN device 102 at the input of the TOA2 positioning unit 404 {i.e., $Y_{TOA2_{init}}$ (at next iteration)=$Y_{TOA2}$ (at previous iteration)} and use Eq. 17 and Eq. 22 to determine the TOA2 location error ($\Delta Y_{TOA2}^T$) at the next iteration and the estimated location of the unknown WLAN device 102 ($Y_{TOA2}$) until the TOA2 location error is below a threshold error value or until a threshold number of iterations have been executed.

Figure 5:
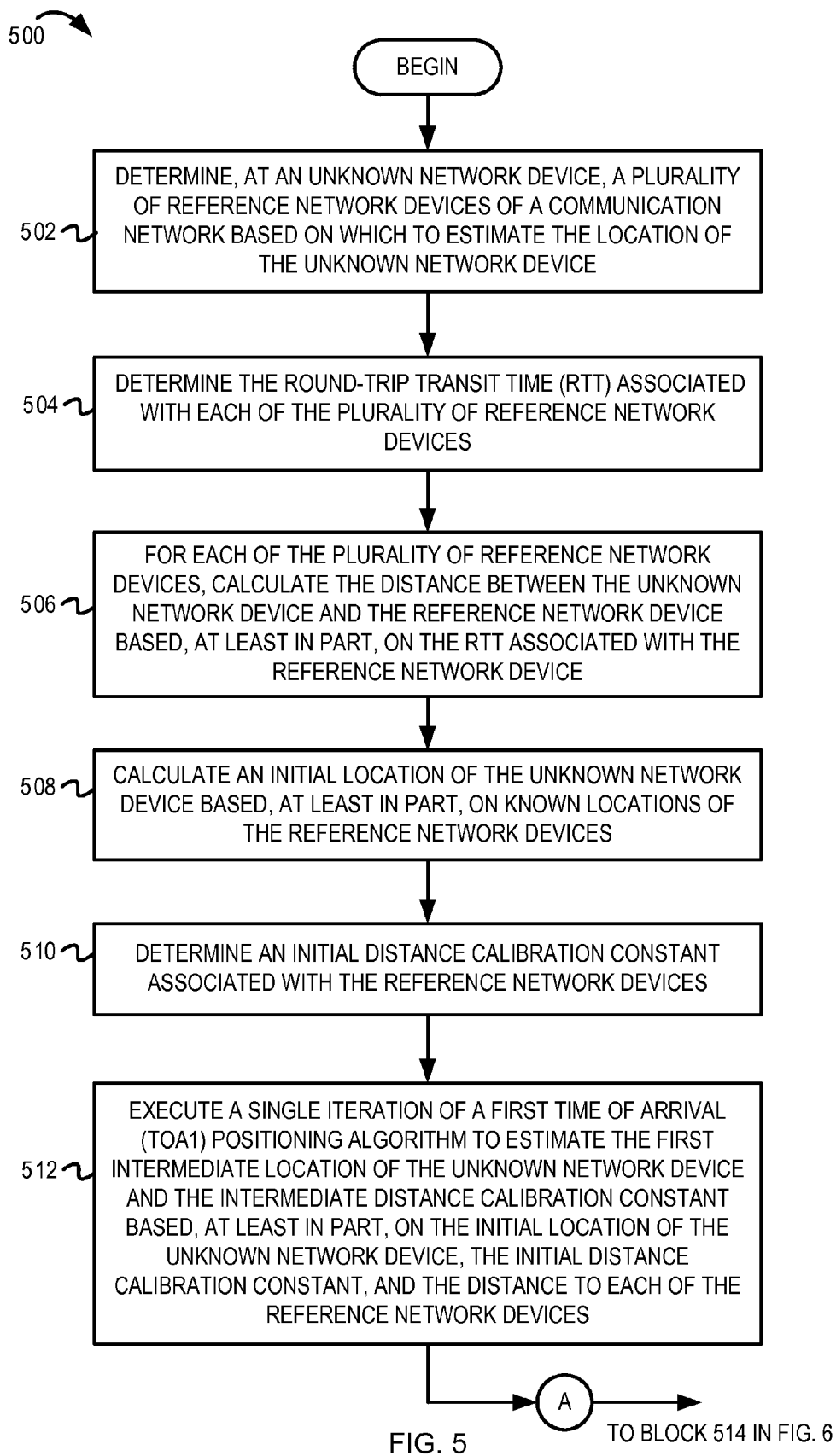
FIG. 5 depicts a flow diagram illustrating example operations of a hybrid TOA positioning mechanism.
Figure 6:
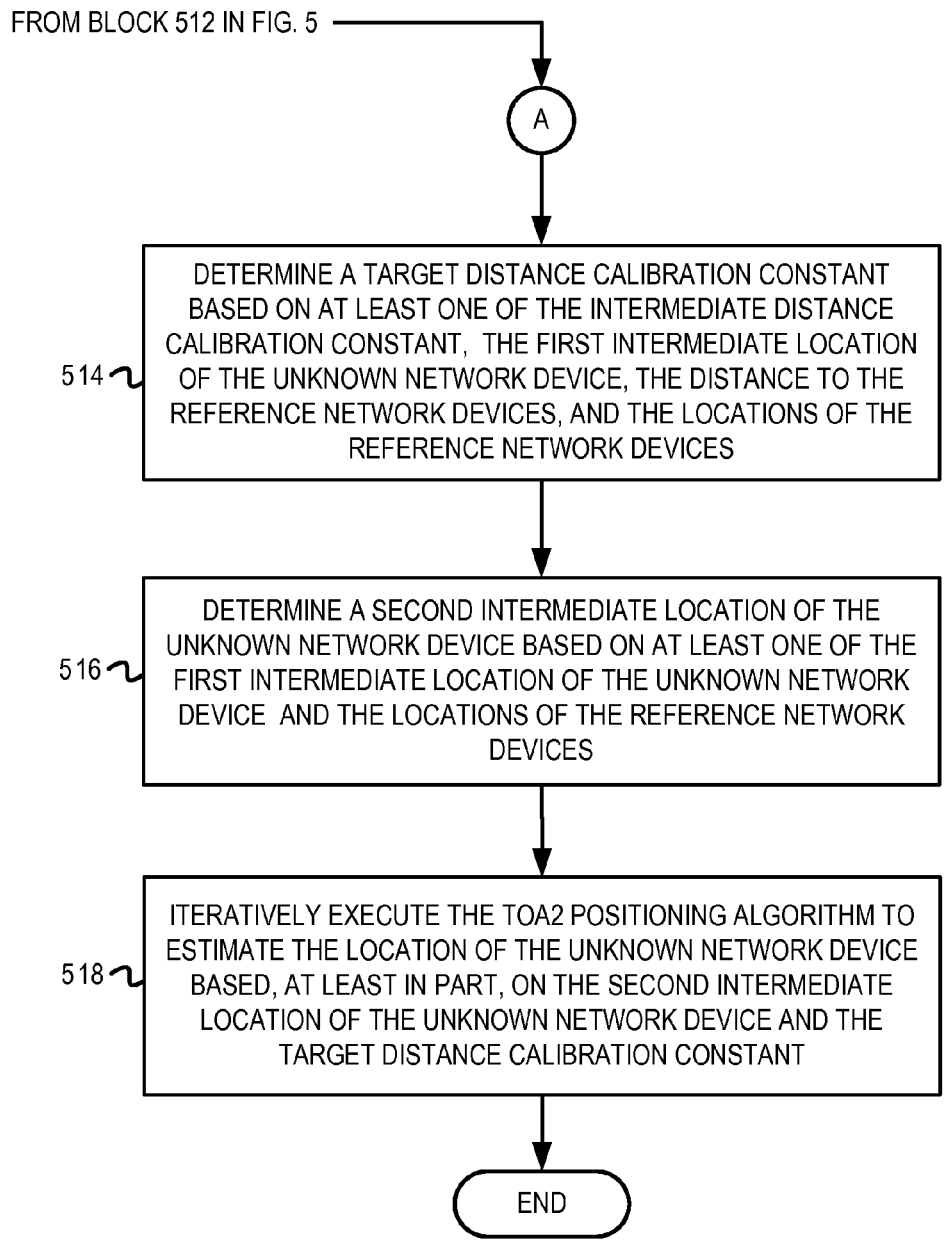
FIG. 6 is a continuation of FIG. 5 and also illustrates example operations of a hybrid TOA positioning mechanism.

FIG. 5 and FIG. 6 depict a flow diagram ("flow") 500 illustrating example operations of a hybrid TOA positioning mechanism. The flow 500 begins at block 502 in FIG. 5.

At block 502, an unknown network device determines a plurality of reference network devices of a communication network based on which to estimate the location of the unknown network device. With reference to the example of FIG. 1, the location calculation unit 110 of the unknown WLAN device 102 can identify the reference WLAN devices 104, 106, 108, and 112 based on which to estimate the location of the unknown WLAN device 102. As described above in FIG. 3, the location calculation unit 110 can select the reference WLAN devices 104, 106, 108, and 112 from a plurality of WLAN devices as those that are associated with the best performance measurements (e.g., RSSI, PER, etc.). The flow continues at block 504.

At block 504, the round-trip transit time (RTT) associated with each of the plurality of reference network device is determined. In one implementation, as described above in blocks 304-308 of FIG. 3, the location calculation unit 110 can record the time instants at which control messages were transmitted to each of the reference WLAN devices and the time instants at which the corresponding response control messages were received at the unknown WLAN device 102. Accordingly, the location calculation unit 110 can determine the RTT associated with each of the reference WLAN devices 104, 106, 108, and 112. It is noted that in other implementations, the location calculation unit 110 can employ other suitable techniques to determine the RTT associated with the reference WLAN devices 104, 106, 108, and 112. The flow continues at block 506.

At block 506, for each of the plurality of reference network devices, the distance between the unknown network device and the reference network device is calculated based, at least in part, on the RTT associated with the reference network device. For example, the location calculation unit 110 (e.g., the distance calculation unit 202 of FIG. 4) can determine the distance between the unknown WLAN device 102 and each of the plurality of reference WLAN devices, as described above with reference to Eq. 1a of FIG. 2 and with reference to block 310 of FIG. 3. The flow continues at block 508.

At block 508, the initial location of the unknown network device is calculated based, at least in part, on known locations of the reference network devices. For example, the location calculation unit 110 (e.g., the TOA1 initial location calculation unit 204 of FIG. 4) can calculate the initial location of the unknown WLAN device 102, as described above with reference to Eqs. 2a-2c of FIG. 2 and block 312 of FIG. 3. The flow continues at block 510.

At block 510, an initial distance calibration constant associated with the reference network devices is determined. For example, the location calculation unit 110 can determine the initial distance calibration constant 216 associated with the reference network devices. As described above with reference to FIG. 2, the initial distance calibration constant 216 can be zero, a previously determined value, a randomly selected value, etc. The flow continues at block 512.

At block 512, a single iteration of a first time of arrival (TOA1) positioning algorithm is executed to estimate the first intermediate location of the unknown network device and the intermediate distance calibration constant based, at least in part, on the initial location of the unknown network device, the initial distance calibration constant, and the distance to each of reference network devices. The TOA1 positioning algorithm may be used to determine the intermediate value of the distance calibration constant that may be eventually provided to a TOA2 positioning algorithm, as will be described below. In some implementations, the location calculation unit 110 (e.g., the TOA1 positioning unit 206 of FIG. 2) can execute a single iteration of the Taylor series based TOA1 positioning algorithm to estimate the first intermediate location 220 of the unknown WLAN device 102 and the intermediate distance calibration constant 218, as described above in accordance with Eq. 3a to Eq. 12 of FIG. 2. It is noted that in other implementations, the TOA1 positioning unit 206 can employ other suitable techniques to estimate the first intermediate location 220 of the unknown WLAN device 102 and the intermediate distance calibration constant 218 based, at least in part, on the initial location 214 of the unknown WLAN device 102. The flow continues at block 514 in FIG. 6.

At block 514, a target distance calibration constant is calculated based, at least in part, on the intermediate distance calibration constant, the first intermediate location of the unknown network device, the locations of the reference network devices, and the distance to each of the reference network devices. For example, the location calculation unit 110 (e.g., the TOA2 initial value calculation unit 402) can calculate the target distance calibration constant 406, as described above with reference to Eq. 13a-Eq. 13e of FIG. 4. It is noted that the TOA2 initial value calculation unit 402 can use other suitable techniques to estimate the target distance calibration constant 406. The target distance calibration constant 406 can then be used as an input parameter to a second time of arrival (TOA2) positioning algorithm for iteratively estimating the location of the unknown WLAN device 102, as will be described in block 518. The flow continues at block 516.

At block 516, a second intermediate location of the unknown network device is determined based, at least in part, on the first intermediate location of the unknown network device and the locations of the reference network devices. For example, the location calculation unit 110 (e.g., the TOA2 initial value calculation unit 402) can calculate the second intermediate location 408 of the unknown WLAN device 102 as described above in accordance with Eqs 14a-14c of FIG. 4. It is noted that the TOA2 initial value calculation unit 402 can use other suitable techniques to determine the second intermediate location 408 of the unknown WLAN device 102. The second intermediate location 408 of the unknown WLAN device 102 can then be provided as an input parameter to the TOA2 positioning algorithm for iteratively estimating the location of the unknown WLAN device 102, as will be described in block 518. The flow continues at block 518.

At block 518, the TOA2 positioning algorithm is iteratively executed to calculate the estimated location of the unknown network device based, at least in part, on the second intermediate location of the unknown network device and the target distance calibration constant. For example, as described above with reference to Eq. 15-Eq. 22 of FIG. 4, the location calculation unit 110 (e.g., the TOA2 positioning unit 404) can execute multiple iterations of a Taylor-series based TOA2 positioning algorithm to calculate the location 410 of the unknown WLAN device 102 based, at least in part, on the second intermediate location of the unknown network device (determined at block 516), the target distance calibration constant (determined at block 514), and the locations of the reference network devices. It is noted that the TOA2 initial value calculation unit 402 can employ other suitable techniques to determine the estimated location 410 of the unknown WLAN device 102. From block 518, the flow ends.

It should be understood that FIGS. 1-6 are examples meant to aid in understanding embodiments and should not be used to limit embodiments or limit scope of the claims. Embodiments may perform additional operations, fewer operations, operations in a different order, operations in parallel, and some operations differently. It is noted that in some implementations, the location calculation unit 110 can determine (for each reference WLAN device) multiple RTT measurements and multiple distance measurements. For example, the location calculation unit 110 can transmit a predetermined number of control messages to the reference WLAN device 104 and can receive a corresponding number of response control messages. Accordingly, the location calculation unit 110 can calculate the predetermined number of RTT measurements associated with the reference WLAN device 104. In some implementations, the location calculation unit 110 can determine and use the average RTT value for subsequent operations. In other implementations, the location calculation unit 110 can determine a distance to the reference WLAN device 104, for each of the RTT measurements and can determine and use the average distance to the reference WLAN device 104 for subsequent operations.

Although the Figures refer to the unknown WLAN device 102 executing operations described herein to estimate the location of the unknown WLAN device 102, embodiments are not so limited. In other embodiments, functionality for determining the location of the unknown WLAN device 102 can be executed by one or more other suitable electronic devices. In some implementations, one or more of the reference WLAN devices, a centralized server, and/or another suitable electronic device can execute some/all of the operations for determining the location of the unknown WLAN device 102. For example, the unknown WLAN device 102 can determine the RTT associated with each of the reference WLAN devices 102, 106, 108, and 112 and can provide the RTT values to the centralized server (or another device to which the processing has been offloaded). The centralized server can then calculate the location of the unknown WLAN device 102 (as described by FIGS. 1-6) and can communicate the calculated location to the unknown WLAN device 102.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
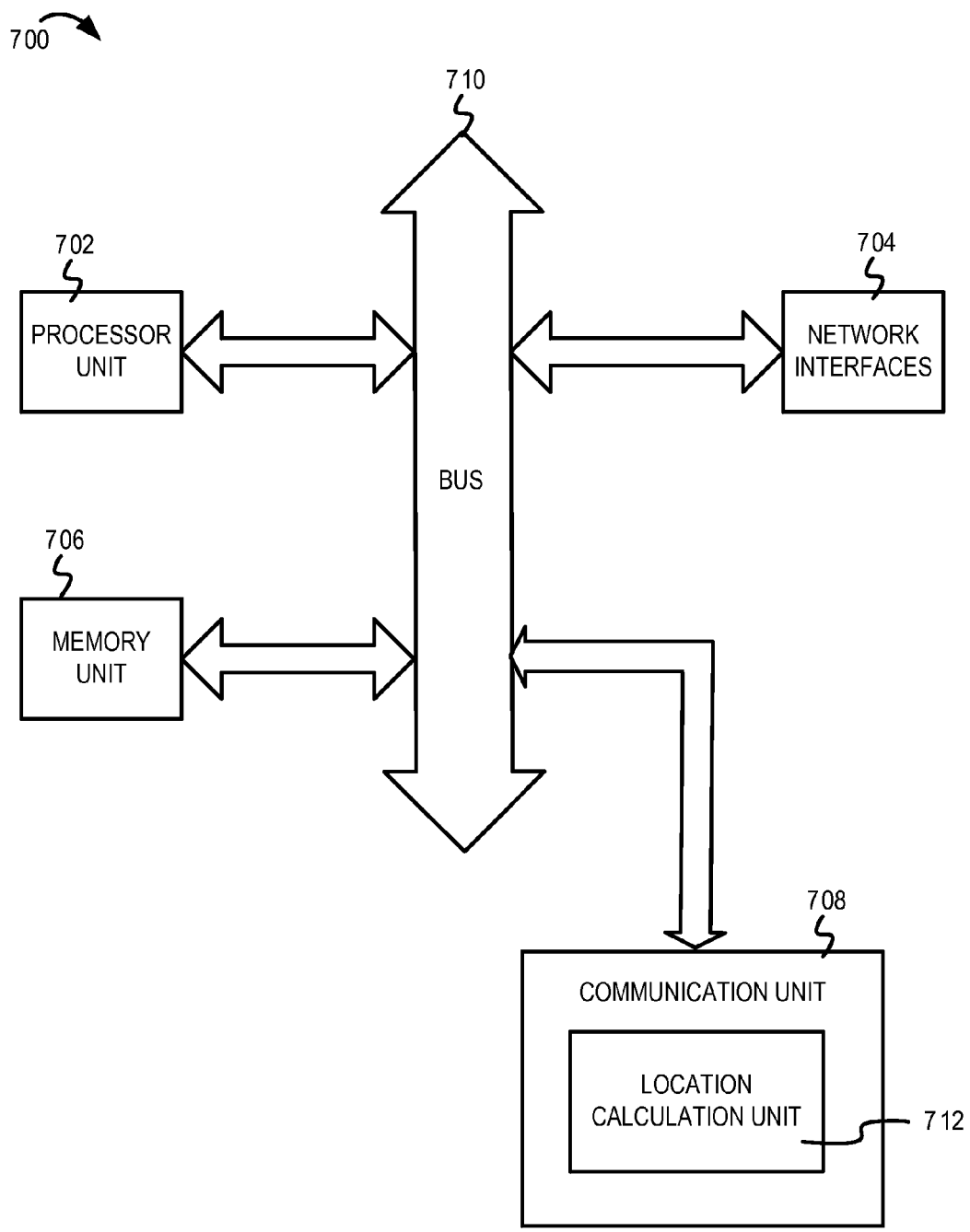
FIG. 7 is a block diagram of one embodiment of an electronic device including a mechanism for determining the location of the electronic device in a wireless communication network.

FIG. 7 is a block diagram of one embodiment of an electronic device 700 including a mechanism for determining the location of the electronic device in a wireless communication network. In some implementations, the electronic device 700 may be one of a laptop computer, a tablet computer, a netbook, a mobile phone, a smart appliance, a gaming console, or other electronic systems comprising wireless communication capabilities. The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, HyperTransport®, InfiniBand®, NuBus, AHB, AXI, etc.), and network interfaces 704 that include at least one of a wireless network interface (e.g., a WLAN interface, a Bluetooth® interface, a WiMAX interface, a ZigBee®interface, a Wireless USB interface, etc.) and a wired network interface (e.g., a power-line communication interface, an Ethernet interface, etc.).

The electronic device 700 also includes a communication unit 708. The communication unit 708 comprises a location calculation unit 712. In some implementations, the location calculation unit 712 can execute a single iteration of a first TOA positioning algorithm to estimate the location of the electronic device 700 based, at least in part, on a calculated initial location of the electronic device 700, the distance between the electronic device 700 and each of a plurality of reference WLAN devices, and the location of each of the plurality of reference WLAN devices, as described with reference to FIGS. 1-3. In other implementations, the location calculation unit 712 can execute a hybrid TOA positioning algorithm to estimate the location of the electronic device 700, as described above with reference to FIGS. 1 and 4-6. Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, the memory unit 706, and the network interfaces 704 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, techniques for a TOA based positioning system or techniques for a hybrid TOA based positioning system as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, at a wireless network device of a communication network, a round trip transit time between the wireless network device and each of a plurality of reference wireless network devices of the communication network;
   for each of the plurality of reference wireless network devices, determining a distance between the wireless network device and the reference wireless network device based, at least in part, on the round trip transit time between the wireless network device and the reference wireless network device;
   determining an initial location of the wireless network device based, at least in part, on a known location of each of the plurality of reference wireless network devices;
   determining a first intermediate location of the wireless network device and an intermediate distance calibration constant based, at least in part, on the initial location of the wireless network device and the distance between the wireless network device and each of the plurality of reference wireless network devices;
   determining a second intermediate location of the wireless network device based on at least one of the known location of each of the plurality of reference wireless network devices and the first intermediate location of the wireless network device;
   determining a target distance calibration constant associated with the plurality of reference wireless network devices based on at least one of the first intermediate location of the wireless network device, the intermediate distance calibration constant, and the distance between the wireless network device and the plurality of reference wireless network devices; and
   iteratively estimating a current location of the wireless network device based, at least in part, on the second intermediate location of the wireless network device and the target distance calibration constant.

2. The method of claim 1, wherein said determining the first intermediate location of the wireless network device comprises:
   executing a single iteration of a first Taylor series based time of arrival positioning algorithm to estimate the first intermediate location of the wireless network device based, at least in part, on the initial location of the wireless network device, the distance between the wireless network device and each of the plurality of reference wireless network devices, an initial distance calibration constant, and the known location of each of the plurality of reference wireless network devices.

3. The method of claim 2, wherein the initial distance calibration constant is one of a zero value, a predetermined value, and a dynamically selected random value.

4. The method of claim 2, wherein said determining the first intermediate location of the wireless network device further comprises determining an intermediate distance calibration constant based, at least in part, on the initial location of the wireless network device, the distance between the wireless network device and each of the plurality of reference wireless network devices, the initial distance calibration constant, and the known location of each of the plurality of reference wireless network devices in response to said executing the single iteration of the first Taylor series based TOA positioning algorithm.

5. The method of claim 2, wherein said iteratively estimating the current location of the wireless network device comprises:
   iteratively executing a second Taylor series based time of arrival positioning algorithm to estimate the current location of the wireless network device based, at least in part, on the second intermediate location of the wireless network device, the target distance calibration constant, the distance between the wireless network device and each of the plurality of reference wireless network devices, and the known location of each of the plurality of reference wireless network devices.

6. The method of claim 1, wherein said determining the target distance calibration constant associated with the plurality of reference wireless network devices comprises:
   designating the intermediate distance calibration constant as the target distance calibration constant.

7. The method of claim 1, wherein said determining the target distance calibration constant associated with the plurality of reference wireless network devices comprises:
   for each of the plurality of reference wireless network devices,
      determining a first distance between the wireless network device and the reference wireless network device based, at least in part, on the round trip transit time between the wireless network device and the reference wireless network device;
      determining a second distance between the wireless network device and the reference wireless network device based, at least in part, on the known location of the reference wireless network device and the first intermediate location of the wireless network device;
      determining a distance difference associated with the reference wireless network device as a difference between the first distance and the second distance; and
   determining the distance calibration constant associated with the plurality of reference wireless network devices as a combination of the distance difference associated with each of the plurality of reference wireless network devices.

8. The method of claim 7, wherein said determining the distance calibration constant associated with the plurality of reference wireless network devices as the combination of the distance difference associated with each of the plurality of reference wireless network devices comprises:
   multiplying the distance difference associated with each of the plurality of the reference wireless network devices with a corresponding weighting factor associated each of the plurality of the reference wireless network devices to yield a plurality of weighted distance differences associated with corresponding each of the plurality of reference wireless network devices; and
   combining the plurality of weighted distance differences to yield the distance calibration constant associated with the plurality of reference wireless network devices.

9. The method of claim 8, further comprising:
   determining, for each of the plurality of reference wireless network devices, the weighting factor associated with the reference wireless network device as an inverse of a total number of the plurality of the reference wireless network devices, or
   determining, for each of the plurality of reference wireless network devices, the weighting factor associated with the reference wireless network device based, at least in part, on a distance between the wireless network device and the reference wireless network device.

10. The method of claim 1, wherein said determining the second intermediate location of the wireless network device comprises one of:
- determining the second intermediate location of the wireless network device as an average of the known location of each of the plurality of reference wireless network devices;
- determining the second intermediate location of the wireless network device as a weighted average of the known location of each of the plurality of reference wireless network devices; or
- designating the first intermediate location of the wireless network device as the second intermediate location of the wireless network device.

11. The method of claim 1, wherein said determining the initial location of the wireless network device based, at least in part, on the known location of each of the plurality of reference wireless network devices comprises:
- determining the initial location of the wireless network device as an average of the known location of each of the plurality of reference wireless network devices, or
- determining the initial location of the wireless network device as a weighted combination of the known location of at least a subset of the plurality of reference wireless network devices.

12. The method of claim 1, wherein said determining the initial location of the wireless network device based, at least in part, on the known location of each of the plurality of reference wireless network devices comprises:
- determining a location error matrix, wherein each element of the location error matrix represents a difference between an estimated location coordinate of the wireless network device and a corresponding initial location coordinate of the initial location of the wireless network device;
- determining a distance error matrix, wherein each element of the distance error matrix represents a difference between a measured distance between the wireless network device and one of the plurality of reference wireless network devices and an estimated distance between the wireless network device and the one of the plurality of reference wireless network devices, wherein the measured distance is determined based, at least in part, on the round trip transit time between the wireless network device and the one of the plurality of reference wireless network devices, wherein the estimated distance is determined based, at least in part, on the known location of the one of the plurality of reference wireless network devices and the initial location of the wireless network device;
- determining a coefficient matrix as the product of the distance error matrix and an inverse of a transpose of the location error matrix; and
- determining the initial location of the wireless network device based, at least in part, on maximizing the determinant of the product of the coefficient matrix and a transpose of the coefficient matrix.

13. The method of claim 1, further comprising:
- identifying the plurality of reference wireless network devices based, at least in part, on analyzing one or more performance measurements associated with at least each of the plurality of reference wireless network devices.

14. The method of claim 1, wherein the wireless network device and the plurality of reference wireless network devices comprise wireless local area network (WLAN) communication capabilities.

15. A wireless network device comprising:
a network interface; and
a location calculation unit coupled with the network interface, the location calculation unit operable to:
- determine a round trip transit time between the wireless network device and each of a plurality of reference wireless network devices of a communication network;
- for each of the plurality of reference wireless network devices, determine a distance between the wireless network device and the reference wireless network device based, at least in part, on the round trip transit time between the wireless network device and the reference wireless network device;
- determine an initial location of the wireless network device based, at least in part, on a known location of each of the plurality of reference wireless network devices;
- determine a first intermediate location of the wireless network device and an intermediate distance calibration constant based, at least in part, on the initial location of the wireless network device and the distance between the wireless network device and each of the plurality of reference wireless network devices;
- determine a second intermediate location of the wireless network device based on at least one of the known location of each of the plurality of reference wireless network devices and the first intermediate location of the wireless network device;
- determine a target distance calibration constant associated with the plurality of reference wireless network devices based on at least one of the first intermediate location of the wireless network device, the intermediate distance calibration constant, and the distance between the wireless network device and the plurality of reference wireless network devices; and
- iteratively estimate a current location of the wireless network device based, at least in part, on the second intermediate location of the wireless network device and the target distance calibration constant.

16. The wireless network device of claim 15, wherein:
the location calculation unit operable to determine the first intermediate location of the wireless network device and the intermediate distance calibration constant comprises the location calculation unit operable to:
- execute a single iteration of a first Taylor series based time of arrival positioning algorithm to estimate the first intermediate location of the wireless network device and the intermediate distance calibration constant based, at least in part, on the initial location of the wireless network device, the distance between the wireless network device and each of the plurality of reference wireless network devices, an initial distance calibration constant, and the known location of each of the plurality of reference wireless network devices; and the location calculation unit operable to iteratively estimate the current location of the wireless network device comprises the location calculation unit operable to:
- iteratively execute a second Taylor series based time of arrival positioning algorithm to estimate the current location of the wireless network device based, at least in part, on the second intermediate location of the wireless network device, the target distance calibration constant, the distance between the wireless network device and each of the plurality of reference wireless network devices, and the known location of each of the plurality of reference wireless network devices.

17. The wireless network device of claim 15, wherein the location calculation unit operable to determine the target distance calibration constant associated with the plurality of reference wireless network devices comprises the location calculation unit operable to:

for each of the plurality of reference wireless network devices,
  determine a first distance between the wireless network device and the reference wireless network device based, at least in part, on the round trip transit time between the wireless network device and the reference wireless network device;
  determine a second distance between the wireless network device and the reference wireless network device based, at least in part, on the known location of the reference wireless network device and the first intermediate location of the wireless network device;
  determine a distance difference associated with the reference wireless network device as a difference between the first distance and the second distance; and
multiply the distance difference associated with each of the plurality of the reference wireless network devices with a corresponding weighting factor associated each of the plurality of the reference wireless network devices to yield a plurality of weighted distance differences associated with corresponding each of the plurality of reference wireless network devices; and
combine the plurality of weighted distance differences to yield the distance calibration constant associated with the plurality of reference wireless network devices.

18. The wireless network device of claim 17, wherein the location calculation unit is further operable to:
  determine, for each of the plurality of reference wireless network devices, the weighting factor associated with the reference wireless network device as an inverse of a total number of the plurality of the reference wireless network devices, or
  determine, for each of the plurality of reference wireless network devices, the weighting factor associated with the reference wireless network device based, at least in part, on a distance between the wireless network device and the reference wireless network device.

19. The wireless network device of claim 15, wherein the location calculation unit operable to determine the second intermediate location of the wireless network device comprises one of:
  the location calculation unit operable to determine the second intermediate location of the wireless network device as an average of the known location of each of the plurality of reference wireless network devices;
  the location calculation unit operable to determine the second intermediate location of the wireless network device as a weighted average of the known location of each of the plurality of reference wireless network devices; or
  the location calculation unit operable to designate the first intermediate location of the wireless network device as the second intermediate location of the wireless network device.

20. The wireless network device of claim 15, wherein the location calculation unit operable to determine the initial location of the wireless network device based, at least in part, on the known location of each of the plurality of reference wireless network devices comprises the location calculation unit operable to:
  determine the initial location of the wireless network device as an average of the known location of each of the plurality of reference wireless network devices, or
  determine the initial location of the wireless network device as a weighted combination of the known location of at least a subset of the plurality of reference wireless network devices.

21. One or more non-transitory machine-readable storage media having instructions stored therein, which when executed by one or more processors causes the one or more processors to perform operations that comprise:
  determining, at a wireless network device of a communication network, a round trip transit time between the wireless network device and each of a plurality of reference wireless network devices of the communication network;
  for each of the plurality of reference wireless network devices, determining a distance between the wireless network device and the reference wireless network device based, at least in part, on the round trip transit time between the wireless network device and the reference wireless network device;
  determining an initial location of the wireless network device based, at least in part, on a known location of each of the plurality of reference wireless network devices;
  determining a first intermediate location of the wireless network device and an intermediate distance calibration constant based, at least in part, on the initial location of the wireless network device and the distance between the wireless network device and each of the plurality of reference wireless network devices;
  determining a second intermediate location of the wireless network device based on at least one of the known location of each of the plurality of reference wireless network devices and the first intermediate location of the wireless network device;
  determining a target distance calibration constant associated with the plurality of reference wireless network devices based on at least one of the first intermediate location of the wireless network device, the intermediate distance calibration constant, and the distance between the wireless network device and the plurality of reference wireless network devices; and
  iteratively estimating a current location of the wireless network device based, at least in part, on the second intermediate location of the wireless network device and the target distance calibration constant.

22. The non-transitory machine-readable storage media of claim 21, wherein:
  said operation of determining the first intermediate location of the wireless network device and the intermediate distance calibration constant comprises:
    executing a single iteration of a first Taylor series based time of arrival positioning algorithm to estimate the first intermediate location of the wireless network device and the intermediate distance calibration constant based, at least in part, on the initial location of the wireless network device, the distance between the wireless network device and each of the plurality of reference wireless network devices, an initial distance calibration constant, and the known location of each of the plurality of reference wireless network devices; and said operation of iteratively estimating the current location of the wireless network device comprises:

iteratively executing a second Taylor series based time of arrival positioning algorithm to estimate the current location of the wireless network device based, at least in part, on the second intermediate location of the wireless network device, the target distance calibration constant, the distance between the wireless network device and each of the plurality of reference wireless network devices, and the known location of each of the plurality of reference wireless network devices.

23. The non-transitory machine-readable storage media of claim 21, wherein said operation of determining the target distance calibration constant associated with the plurality of reference wireless network devices comprises:

for each of the plurality of reference wireless network devices, determining a first distance between the wireless network device and the reference wireless network device based, at least in part, on the round trip transit time between the wireless network device and the reference wireless network device;

determining a second distance between the wireless network device and the reference wireless network device based, at least in part, on the known location of the reference wireless network device and the first intermediate location of the wireless network device;

determining a distance difference associated with the reference wireless network device as a difference between the first distance and the second distance; and determining the distance calibration constant associated with the plurality of reference wireless network devices as a combination of the distance difference associated with each of the plurality of reference wireless network devices.

24. The non-transitory machine-readable storage media of claim 21, wherein said operation of determining the second intermediate location of the wireless network device comprises one of:

determining the second intermediate location of the wireless network device as an average of the known location of each of the plurality of reference wireless network devices;

determining the second intermediate location of the wireless network device as a weighted average of the known location of each of the plurality of reference wireless network devices; or designating the first intermediate location of the wireless network device as the second intermediate location of the wireless network device.

25. The non-transitory machine-readable storage media of claim 21, wherein said operation of determining the initial location of the wireless network device based, at least in part, on the known location of each of the plurality of reference wireless network devices comprises:

determining the initial location of the wireless network device as an average of the known location of each of the plurality of reference wireless network devices, or determining the initial location of the wireless network device as a weighted combination of the known location of at least a subset of the plurality of reference wireless network devices.

* * * * *